US012666392B2

(12) United States Patent
Sanchez et al.

(10) Patent No.: US 12,666,392 B2
(45) Date of Patent: Jun. 23, 2026

(54) METHOD TO REDUCE POWER CONSUMPTION IN DUAL RECEIVE MUSIM DEVICES

(71) Applicant: Nokia Technologies Oy, Espoo (FI)

(72) Inventors: Laura Luque Sanchez, Nibe (DK); Frank Frederiksen, Klarup (DK); Devaki Chandramouli, Plano, TX (US); Nuno Manuel Kiilerich Pratas, Gistrup (DK); Jakob Lindbjerg Buthler, Aalborg (DK); Faranaz Sabouri-Sichani, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 903 days.

(21) Appl. No.: 17/997,871

(22) PCT Filed: May 27, 2021

(86) PCT No.: PCT/FI2021/050382
§ 371 (c)(1),
(2) Date: Nov. 3, 2022

(87) PCT Pub. No.: WO2021/260257
PCT Pub. Date: Dec. 30, 2021

(65) Prior Publication Data
US 2023/0199713 A1 Jun. 22, 2023

Related U.S. Application Data

(60) Provisional application No. 63/042,751, filed on Jun. 23, 2020.

(51) Int. Cl.
*H04W 68/02* (2009.01)
*H04W 24/08* (2009.01)

(52) U.S. Cl.
CPC ........... *H04W 68/02* (2013.01); *H04W 24/08* (2013.01)

(58) Field of Classification Search
None
See application file for complete search history.

(56) References Cited

U.S. PATENT DOCUMENTS 9,451,614 B2    9/2016  Krishnamurthy
12,323,904 B2 *  6/2025  Agiwal ................. H04W 68/02
(Continued)

FOREIGN PATENT DOCUMENTS

EP       1157579 B1    4/2008
WO    00/52948 A1    9/2000
(Continued)

OTHER PUBLICATIONS

"3rd Generation Partnership Project; Technical Specification Group Radio Access Network; NG-RAN; NG Application Protocol (NGAP) (Release 16)", 3GPP TS 38.413, V16.0.0, Dec. 2019, pp. 1-335.
(Continued)

*Primary Examiner* — Hassan A Phillips
*Assistant Examiner* — Gautam Sharma
(74) *Attorney, Agent, or Firm* — Alston & Bird LLP

(57) ABSTRACT

A method includes aligning a plurality of paging occasions across at least two identities of a communication device; and requesting and receiving from a communication network a paging occasion for the communication device with at least two identities using at least one of the identities to perform the aligning; or requesting and receiving from the communication network a reallocation of a paging offset using at least one of the identities to perform the aligning.

20 Claims, 18 Drawing Sheets

(56) References Cited

U.S. PATENT DOCUMENTS

| | | | |
|---|---|---|---|
| 2012/0088502 A1 | 4/2012 | Chin et al. | |
| 2014/0295835 A1 | 10/2014 | Lamazure | |
| 2017/0048773 A1 | 2/2017 | Miao et al. | |
| 2018/0070303 A1 | 3/2018 | Tambaram Kailasam et al. | |
| 2019/0281580 A1* | 9/2019 | Rune ..................... | H04W 76/28 |
| 2020/0196273 A1 | 6/2020 | Ozturk et al. | |
| 2022/0201648 A1* | 6/2022 | Nord ..................... | H04W 8/183 |
| 2022/0248369 A1* | 8/2022 | Wu ....................... | H04W 24/08 |

FOREIGN PATENT DOCUMENTS

| | | |
|---|---|---|
| WO | 2018/161244 A1 | 9/2018 |
| WO | 2020/178483 A1 | 9/2020 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NR; User Equipment (UE) procedures in Idle mode and RRC Inactive state (Release 16)", 3GPP TS 38.304, V16.0.0, Mar. 2020, pp. 1-38.

"Revised SID: Study on system enablers for multi-SIM devices", TSG SA Meeting #SP-83, SP-190248, Agenda: 17B.19, SA WG2, Mar. 20-22, 2019, 4 pages.

"3rd Generation Partnership Project; Technical Specification Group Services and System Aspects; Study on Support for Multi-USIM Devices (Release 17)", 3GPP TR 22.834, V17.2.0, Dec. 2019, pp. 1-17.

"3rd Generation Partnership Project; Technical Specification Group Services and System Aspects; Study on system enablers for devices having multiple Universal Subscriber Identity Modules (USIM) (Release 17)", 3GPP TR 23.761, V0.3.0, Jan. 2020, pp. 1-37.

"New WID: Support for Multi-SIM devices in Rel-17", 3GPP TSG RAN Meeting #86, RP-193263, Agenda: 9.1.2, vivo, Dec. 9-12, 2019, 5 pages.

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

"3rd Generation Partnership Project; Technical Specification Group Radio Access Network; NR; Study on User Equipment (UE) power saving in NR (Release 16)", 3GPP TR 38.840, V16.0.0, Jun. 2019, pp. 1-74.

"3rd Generation Partnership Project; Technical Specification Group Core Network and Terminals; Non-Access-Stratum (NAS) protocol for 5G System (5GS); Stage 3; (Release 16)", 3GPP TS 24.501, V16.4.1, Mar. 2020, pp. 1-666.

International Search Report and Written Opinion received for corresponding Patent Cooperation Treaty Application No. PCT/FI2021/050382, dated Sep. 9, 2021, 15 pages.

"Solution for improved paging in MUSIM devices (KI#1,2,3)", SA WG2 Meeting #136-AH, S2-2000855, Agenda: 8.4, Nokia, Jan. 13-17, 2020, pp. 1-7.

* cited by examiner

| UEAssistanceInformation FIELD DESCRIPTIONS |
| --- |
| delayBudgetReport |
| reducedBW–FR1–DL |
| reducedBW–FR1–UL |
| reducedBW–FR2–DL |
| reducedBW–FR2–UL |
| reducedCCsDL |
| reducedCCsUL |
| reducedMIMO–LayersFR1–DL |
| reducedMIMO–LayersFR1–UL |
| reducedMIMO–LayersFR2–DL |
| reducedMIMO–LayersFR2–UL |
| type1 |
| preferredPagingOccasion <– NEW ELEMENT INDICATES THE PAGING OCCASION FOR FULL OR SEQUENTIAL ALIGNMENT, OR THE CURRENT PAGING OCCASION ALLOCATED TO THE OTHER USIM IN THE DEVICE. VALUES COULD BE GIVEN AS AN ABSOLUTE TIME, AS A TIME OFFSET RELATIVE TO THE CURRENT SYSTEM TIMING (BASED ON SYSTEM FRAME NUMBER), OR AS A TIME OFFSET FROM THE CURRENT PAGING OCCASION |

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| MESSAGE TYPE | M | | 9.3.1.1 | | YES | IGNORE |
| UE PAGING IDENTITY | M | | 9.3.3.18 | | YES | IGNORE |
| PAGING DRX | O | | 9.3.1.90 | | YES | IGNORE |
| TAI LIST FOR PAGING | | 1 | | | YES | IGNORE |
| >TAI LIST FOR PAGING ITEM | | 1..<maxnoofT AIforPaging> | | | – | |
| >>TAI | M | | 9.3.3.11 | | – | |
| PAGING PRIORITY | O | | 9.3.1.78 | | YES | IGNORE |
| UE RADIO CAPABILITY FOR PAGING | O | | 9.3.1.68 | | YES | IGNORE |
| PAGING ORIGIN | O | | 9.3.3.22 | | YES | IGNORE |
| ASSISTANCE DATA FOR PAGING | O | | 9.3.1.69 | | YES | IGNORE |

FIG.9

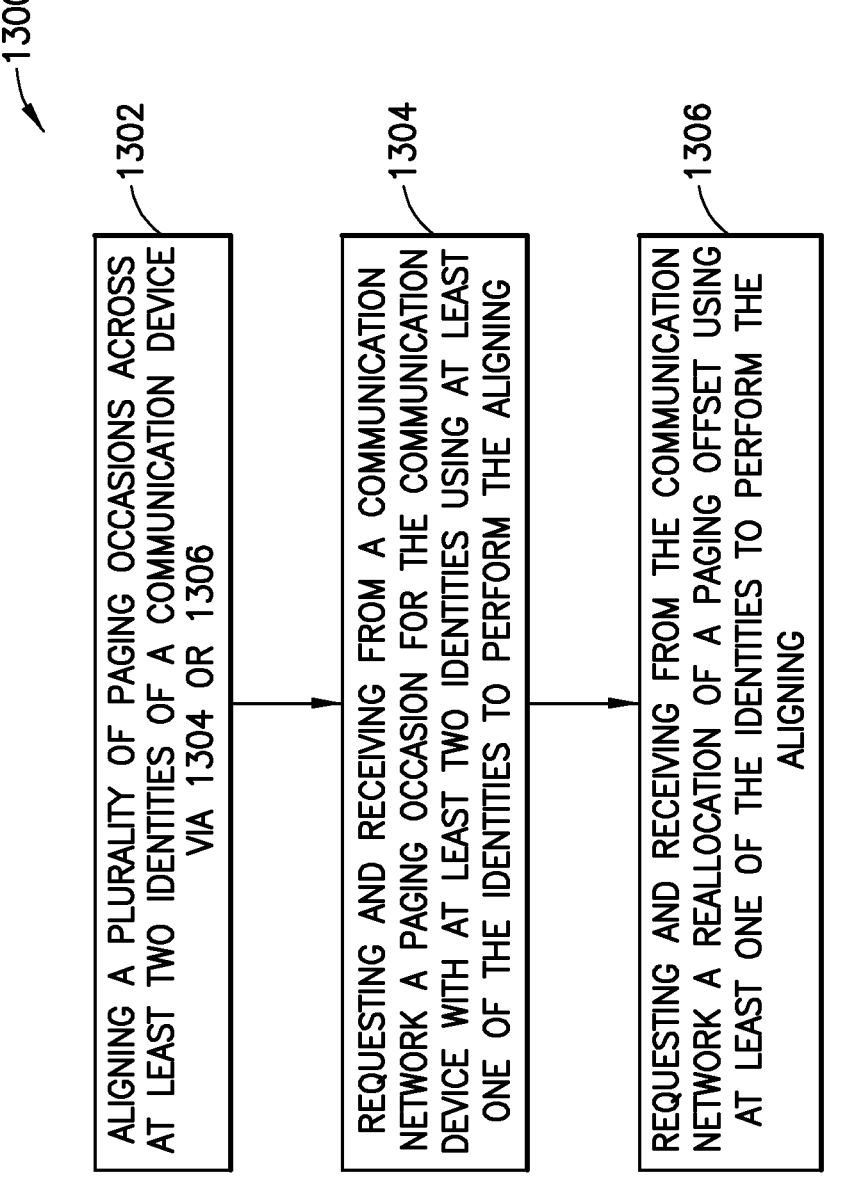

1300

1302

ALIGNING A PLURALITY OF PAGING OCCASIONS ACROSS AT LEAST TWO IDENTITIES OF A COMMUNICATION DEVICE VIA 1304 OR 1306

1304

REQUESTING AND RECEIVING FROM A COMMUNICATION NETWORK A PAGING OCCASION FOR THE COMMUNICATION DEVICE WITH AT LEAST TWO IDENTITIES USING AT LEAST ONE OF THE IDENTITIES TO PERFORM THE ALIGNING

1306

REQUESTING AND RECEIVING FROM THE COMMUNICATION NETWORK A REALLOCATION OF A PAGING OFFSET USING AT LEAST ONE OF THE IDENTITIES TO PERFORM THE ALIGNING

PROVIDING TO A COMMUNICATION DEVICE WITH AT LEAST TWO IDENTITIES: A PAGING OCCASION, OR A REALLOCATION OF A PAGING OFFSET

1404

PROVIDING THE PAGING OCCASION OR THE REALLOCATED PAGING OFFSET AS CONFIGURED TO ALIGN A PLURALITY OF PAGING OCCASIONS FOR THE COMMUNICATION DEVICE

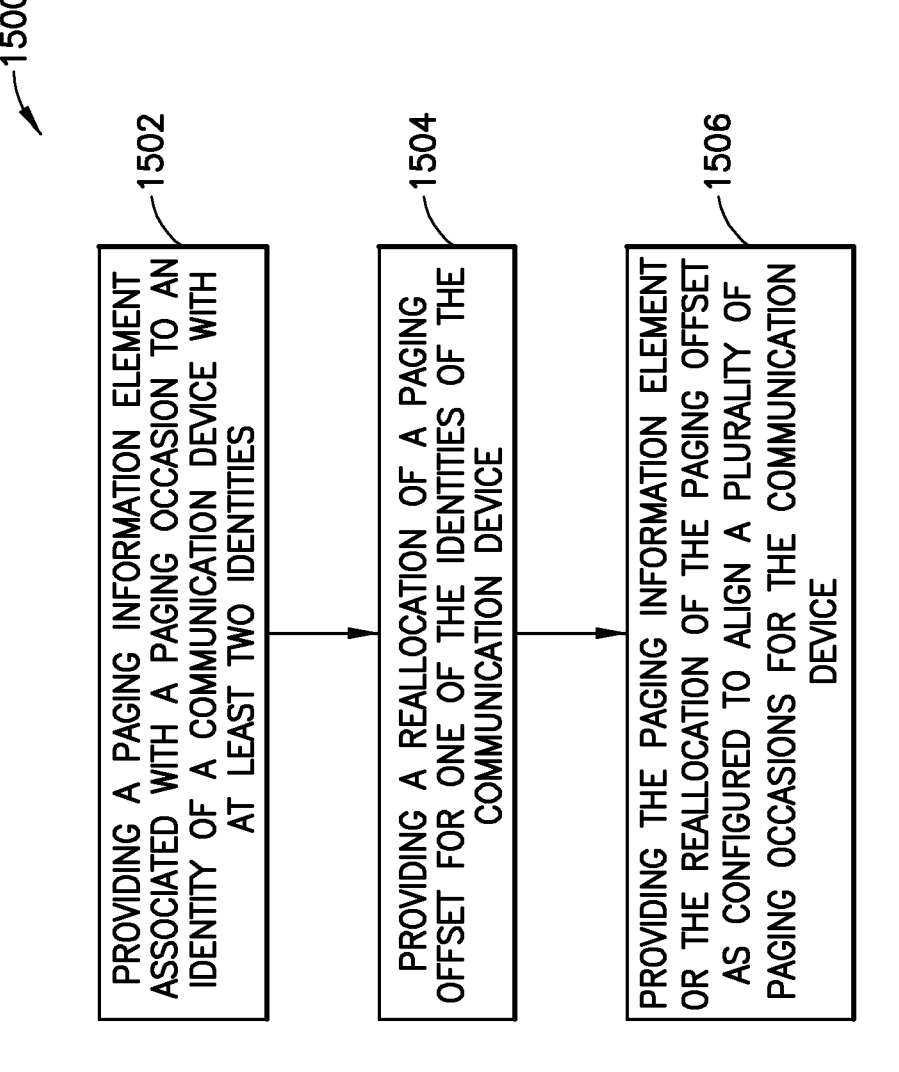

1500

1502
PROVIDING A PAGING INFORMATION ELEMENT ASSOCIATED WITH A PAGING OCCASION TO AN IDENTITY OF A COMMUNICATION DEVICE WITH AT LEAST TWO IDENTITIES

1504
PROVIDING A REALLOCATION OF A PAGING OFFSET FOR ONE OF THE IDENTITIES OF THE COMMUNICATION DEVICE

1506
PROVIDING THE PAGING INFORMATION ELEMENT OR THE REALLOCATION OF THE PAGING OFFSET AS CONFIGURED TO ALIGN A PLURALITY OF PAGING OCCASIONS FOR THE COMMUNICATION DEVICE

FIG.15

METHOD TO REDUCE POWER CONSUMPTION IN DUAL RECEIVE MUSIM DEVICES

TECHNICAL FIELD

The examples and non-limiting embodiments relate generally to communications and, more particularly, to a method to reduce power consumption in MUSIM devices enabled with at least dual receive capabilities.

BACKGROUND

It is known to implement technology to support devices with multiple subscriptions.

SUMMARY

In accordance with an aspect, a method includes aligning a plurality of paging occasions across at least two identities of a communication device; and requesting and receiving from a communication network a paging occasion for the communication device with at least two identities using at least one of the identities to perform the aligning; or requesting and receiving from the communication network a reallocation of a paging offset using at least one of the identities to perform the aligning.

In accordance with an aspect, a method includes providing to a communication device with at least two identities: a paging occasion, or a reallocation of a paging offset; and providing the paging occasion or the reallocated paging offset as configured to align a plurality of paging occasions for the communication device.

In accordance with an aspect, a method includes providing a paging information element associated with a paging occasion to an identity of a communication device with at least two identities; or providing a reallocation of a paging offset for one of the identities of the communication device; and providing the paging information element or the reallocation of the paging offset as configured to align a plurality of paging occasions for the communication device.

In accordance with an aspect, an apparatus includes at least one processor; and at least one non-transitory memory including computer program code; wherein the at least one memory and the computer program code are configured to, with the at least one processor, cause the apparatus at least to: align a plurality of paging occasions across at least two identities of a communication device; and requesting and receiving from a communication network a paging occasion for the communication device with at least two identities using at least one of the identities to perform the aligning; or requesting and receiving from the communication network a reallocation of a paging offset using at least one of the identities to perform the aligning.

In accordance with an aspect, an apparatus includes at least one processor; and at least one non-transitory memory including computer program code; wherein the at least one memory and the computer program code are configured to, with the at least one processor, cause the apparatus at least to: provide to a communication device with at least two identities: a paging occasion, or a reallocation of a paging offset; and provide the paging occasion or the reallocated paging offset as configured to align a plurality of paging occasions for the communication device.

In accordance with an aspect, an apparatus includes at least one processor; and at least one non-transitory memory including computer program code; wherein the at least one memory and the computer program code are configured to, with the at least one processor, cause the apparatus at least to: provide a paging information element associated with a paging occasion to an identity of a communication device with at least two identities; or provide a reallocation of a paging offset for one of the identities of the communication device; and provide the paging information element or the reallocation of the paging offset as configured to align a plurality of paging occasions for the communication device.

In accordance with an aspect, a non-transitory program storage device readable by a machine, tangibly embodying a program of instructions executable by the machine for performing operations is provided, the operations comprising: aligning a plurality of paging occasions across at least two identities of a communication device; and requesting and receiving from a communication network a paging occasion for the communication device with at least two identities using at least one of the identities to perform the aligning; or requesting and receiving from the communication network a reallocation of a paging offset using at least one of the identities to perform the aligning.

In accordance with an aspect, a non-transitory program storage device readable by a machine, tangibly embodying a program of instructions executable by the machine for performing operations is provided, the operations comprising: providing to a communication device with at least two identities: a paging occasion, or a reallocation of a paging offset; and providing the paging occasion or the reallocated paging offset as configured to align a plurality of paging occasions for the communication device.

In accordance with an aspect, a non-transitory program storage device readable by a machine, tangibly embodying a program of instructions executable by the machine for performing operations is provided, the operations comprising: providing a paging information element associated with a paging occasion to an identity of a communication device with at least two identities; or providing a reallocation of a paging offset for one of the identities of the communication device; and providing the paging information element or the reallocation of the paging offset as configured to align a plurality of paging occasions for the communication device.

In accordance with an aspect, an apparatus includes means for aligning a plurality of paging occasions across at least two identities of a communication device; and means for requesting and receiving from a communication network a paging occasion for the communication device with at least two identities using at least one of the identities to perform the aligning; or means for requesting and receiving from the communication network a reallocation of a paging offset using at least one of the identities to perform the aligning.

In accordance with an aspect, an apparatus includes means for providing to a communication device with at least two identities: a paging occasion, or a reallocation of a paging offset; and means for providing the paging occasion or the reallocated paging offset as configured to align a plurality of paging occasions for the communication device.

In accordance with an aspect, an apparatus includes means for providing a paging information element associated with a paging occasion to an identity of a communication device with at least two identities; or means for providing a reallocation of a paging offset for one of the identities of the communication device; and means for providing the paging information element or the reallocation of the paging offset as configured to align a plurality of paging occasions for the communication device.

In accordance with an aspect, an apparatus includes circuitry configured to align a plurality of paging occasions across at least two identities of a communication device; and circuitry configured to request and receive from a communication network a paging occasion for the communication device with at least two identities using at least one of the identities to perform the aligning; or circuitry configured to request and receive from the communication network a reallocation of a paging offset using at least one of the identities to perform the aligning.

In accordance with an aspect, an apparatus includes circuitry configured to provide to a communication device with at least two identities: a paging occasion, or a reallocation of a paging offset; and circuitry configured to provide the paging occasion or the reallocated paging offset as configured to align a plurality of paging occasions for the communication device.

In accordance with an aspect, an apparatus includes circuitry configured to provide a paging information element associated with a paging occasion to an identity of a communication device with at least two identities; or circuitry configured to provide a reallocation of a paging offset for one of the identities of the communication device; and circuitry configured to provide the paging information element or the reallocation of the paging offset as configured to align a plurality of paging occasions for the communication device.

BRIEF DESCRIPTION OF THE DRAWINGS

The foregoing aspects and other features are explained in the following description, taken in connection with the accompanying drawings, wherein:

FIG. 7 shows the UE Assistance Information field descriptions, based on TS38.331, including an added field for the UE's preferred paging occasion.

FIG. 9 shows a message content sent by the AMF used to page a UE in one or several tracking areas.

4

Figure 11A:
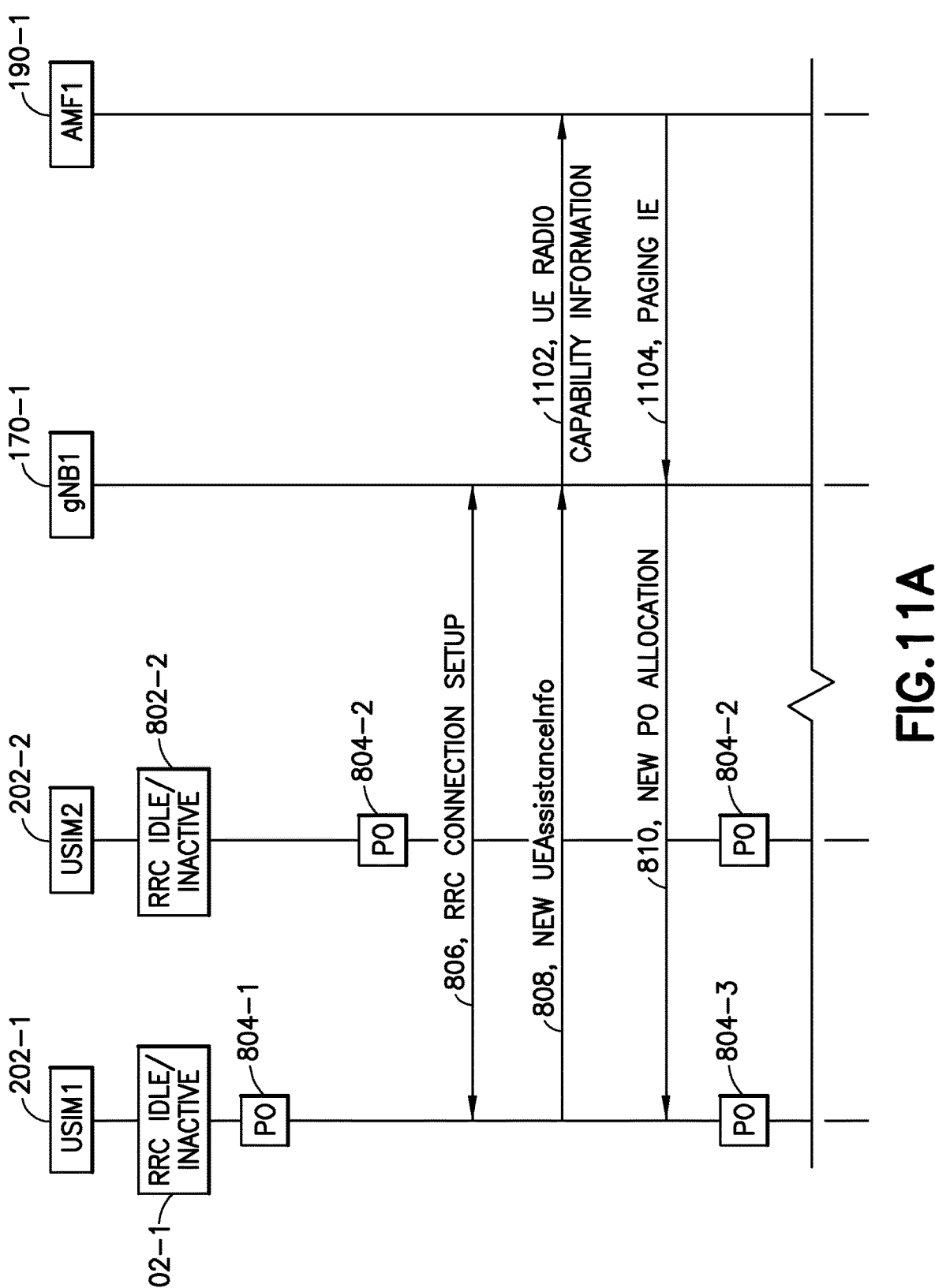
FIG. 11A is an example signaling exchange between a UE and an AMF, where the UE gets a new PO from the AMF, where the PO has a paging IE which contains or carries a new paging ID.
Figure 11B:
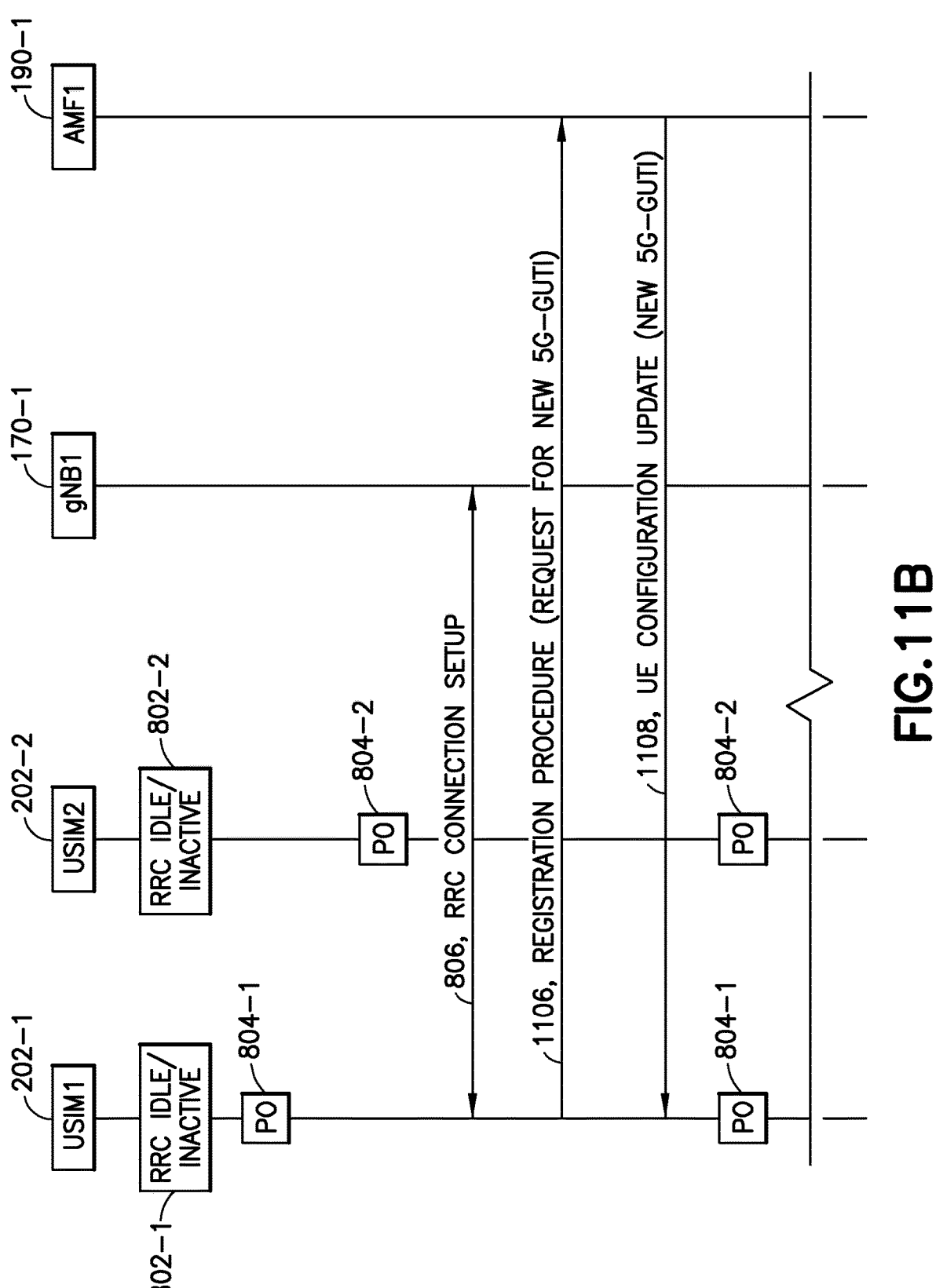

FIG. 11B is an example signaling exchange between a UE and an AMF, where a UE gets a new ID from the AMF using NAS signaling.

Figure 12:
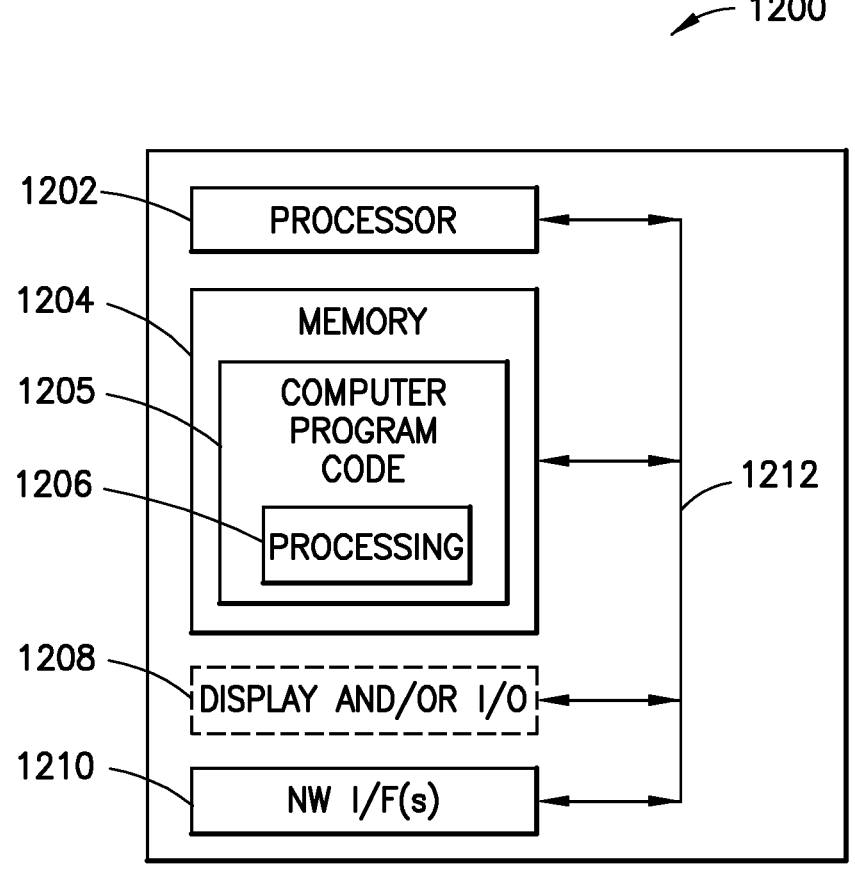

FIG. 12 is an example apparatus, which may be implemented in hardware, configured to implement reducing power consumption in dual receive capable MUSIM devices, based on the examples described herein.

FIG. 13 shows an example method for reducing power consumption in dual receive capable MUSIM devices, based on the examples described herein.

Figure 14:
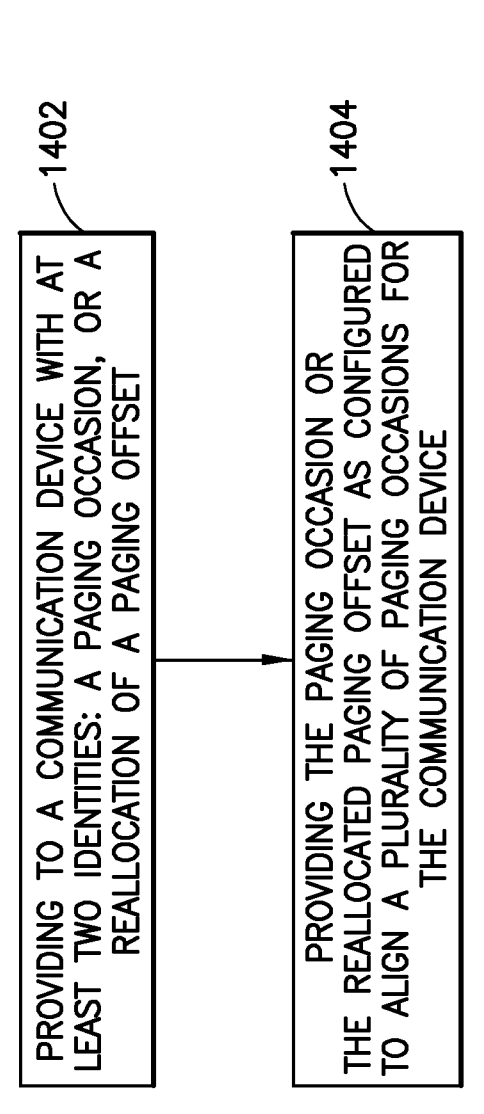

FIG. 14 shows another example method for reducing power consumption in dual receive capable MUSIM devices, based on the examples described herein.

FIG. 15 shows another example method for reducing power consumption in dual receive capable MUSIM devices, based on the examples described herein.

DETAILED DESCRIPTION OF EXAMPLE EMBODIMENTS

As used within this description and drawings, "/" may be interpreted as a recitation of "or", "and", or "both".

Figure 1:
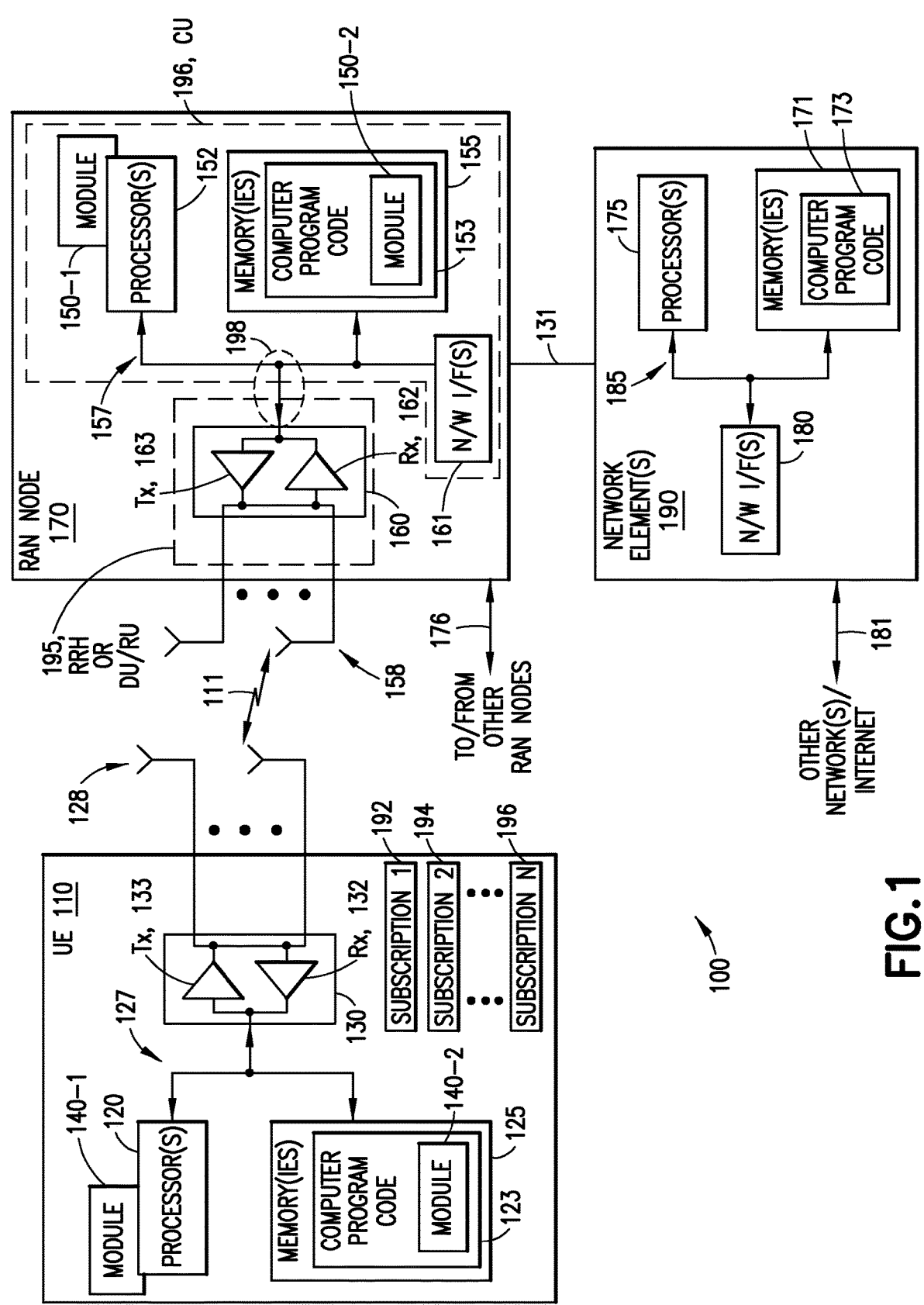
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111. The modules 140-1 and 140-2 may be configured to implement the functionality of the UE as described herein.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

FIG. 1 shows a single UE 110 communicating to the NW (RAN 170+Core 190). Example embodiments relevant for this invention is for devices with multiple subscriptions which are seen as independent UEs on NW side. As the UE 110 has multiple subscriptions, the UE 110 also comprises subscription 1 192, subscription 2 194, up to subscription N 196, where N is greater than or equal to 2. The NW itself can be from the same or different PLMN/MNO. The multiple subscriptions may be in the form of SIMs, USIMs, e-SIMs, certificates, or another other type of identity.

Module 140-1 and/or module 140-2 may implement the functionalities and signaling of the MUSIM UE or MUSIM as herein described. While module 140-1 and module 140-2 are shown in FIG. 1 as being different from subscription 1 192, subscription 2 194 and subscription N 196, the signaling functionality described herein is implemented by units representing the subscriptions, such that subscription 1 192, subscription 2 194, and subscription N 196 are functional units that implement the signaling described herein.

Module 150-1 and/or module 150-2 may implement the functionalities and signaling of the gNB or radio node as herein described. Computer program code 173 may implement the functionalities and signaling of the AMF or network element as herein described.

Overview

The examples described herein relate to support for multi-USIM devices mainly in 5G NR and LTE. 3GPP Release 17 has approved study and normative work to provide support of MUSIM devices on Service and System Aspects (SA). Refer to SP-190248, "Study on system enablers for multi-USIM devices (FS MUSIM)", and the corresponding Technical Reports TR 22.834 and TR 23.761 for SA work.

Figure 2A:
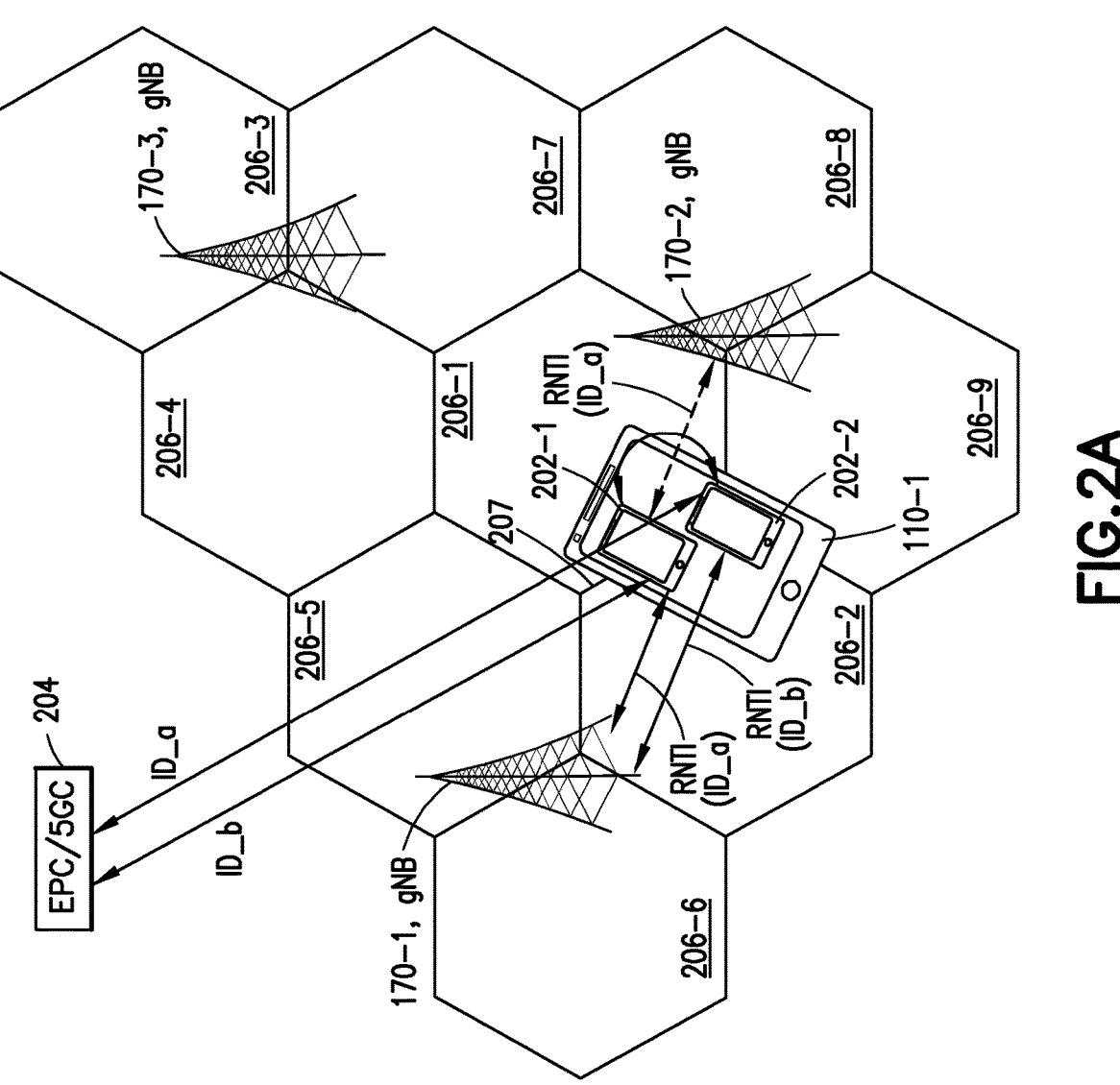
FIG. 2A shows a multi-USIM device with two USIMs belonging to the same MNO.
Figure 2B:
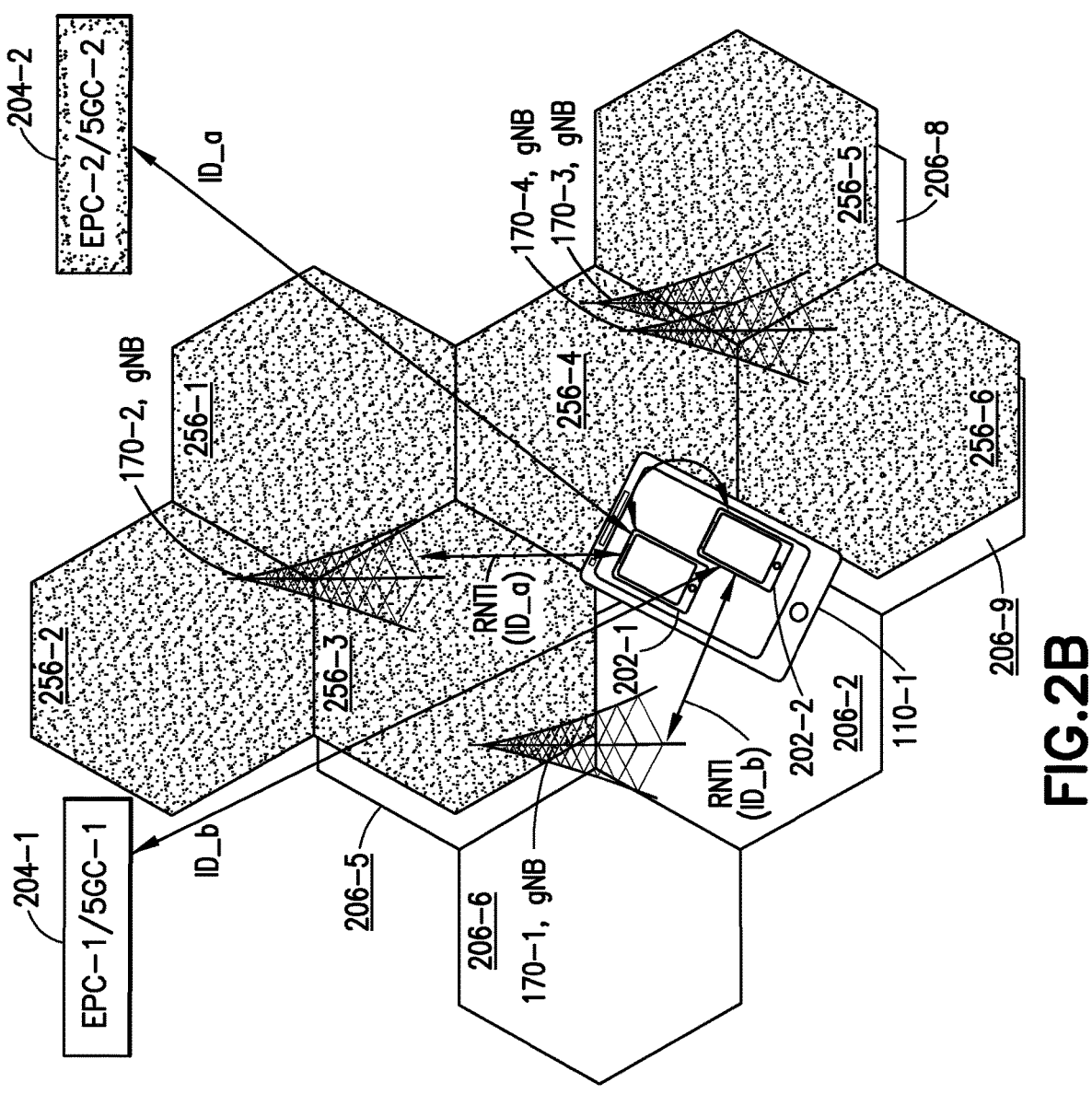
FIG. 2B shows a multi-USIM device with two USIMs belonging to different MNOs.

A multi-USIM device has two (Dual) or more (Multiple) simultaneous 3GPP/3GPP2 network subscriptions with multiple corresponding International Mobile Subscriber Identities (IMSI) at EPS or Subscription Permanent Identifiers (SUPI) at 5GC each associated with a particular USIM belonging to the same or different Mobile Network Operator (MNO) or Mobile Virtual Network Operator (MVNO). A MUSIM device 110-1 connected to one or more gNBs (such as gNB 170-1 and gNB 170-2) with independent subscriptions is shown in FIG. 2A and FIG. 2B. In FIG. 2A, the two USIMs (USIM 202-1 and USIM 202-2 belong to the same MNO/MVNO, are registered with two independent ID's (namely ID a and ID b) at the core network 204, and may be using the same cell or two neighbor cells (such as cell 206-1 and cell 206-2) as a serving cell (where this later case can occur if the UE 110-1 is at the edge (such as edge 207) between two or more cells and due to load balancing or the handover procedures one USIM (e.g., USIM 202-1) gets assigned to a cell while the other USIM (e.g., USIM 202-2) gets assigned to another). In addition to cells 206-1 and 206-2, also shown in FIG. 2A are cells 206-3, 206-4, 206-5, 206-6, 206-7, 206-8, and 206-9, as well as gNB 170-3.

In FIG. 2B, the two USIMs (USIM 202-1 and USIM 202-2) belong to different MNOs and may be using two neighboring or co-located cells (such as cell 206-2 and 256-4) from each MNO as a serving cell. MUSIM devices (such as device 110-1) are widely available in the market—especially in the enhanced Mobile Broad Band (eMBB) section. In FIG. 2B, USIM 202-1 belongs to an MNO associated with gNB 170-2, and is registered with ID a at the core network 204-2 (EPC-2/5GC-2). USIM 202-2 belongs to an MNO associated with gNB 170-1, and is registered with ID b at the core network 204-1 (EPC-1/5GC-1). In FIG. 2B, cells 256-1, 256-2, 256-3, 256-4, 256-5, and 256-6 are associated with one MNO, while cells 206-5, 206-6, 206-2, 206-9, and 206-8 are associated with another MNO. Also shown in FIG. 2B are gNB 170-3 and gNB 170-4.

Multi-USIM Terminology

Two main types of MUSIM devices are normally referred to depending on the supported simultaneous RRC states on the USIMs. The first type is Dual SIM Dual Standby (DSDS) or Multi USIM Multi Standby (MUMS). The first type involves MUSIM devices which are registered with two or more independent subscriber IDs (USIMs) and can be in RRC_IDLE mode on all USIMs. However, it can only be on RRC_CONNECTED mode with a single USIM at a given time. The second type is Dual SIM Dual Active (DSDA) or Multi USIM Multi Active (MUMA). The second type involves MUSIM devices which are registered with two or more independent subscriber IDs (USIMs) and can be in RRC_IDLE mode on all USIMs. And the device can maintain RRC_CONNECTED mode activities on all USIMs.

Furthermore, the UE's behavior with respect to the simultaneous handling of multiple USIMs may depend on the UE's capabilities, including SingleRx/SingleTx, DualRx/SingleTx, and DualRx/DualTx. In SingleRx/SingleTx, the UE is only capable of receiving traffic from one network and/or transmitting traffic to one network at a time (type 1). In DualRx/SingleTx, the UE is capable of simultaneously receiving traffic from two networks but is capable of transmitting to only one network at a time (type 2). In DualRx/DualTx, the UE is capable of simultaneously receiving and/or transmitting to/from two networks (type 3). The examples described herein are applicable to DualRx devices, i.e. devices which are capable to run two independent simultaneous receptions.

Paging Reception Mechanism

The Paging Frame (PF) and Paging Occasion (PO) are determined based on the UE_ID, as defined in TS 38.304 in section 7.1:

"The PF and PO for paging are determined by the following formulae:

SFN for the

PF is determined by:

(SFN+PF_offset) mod T=(T div N)*(UE_ID mod N)

Index (i_s), indicating the index of the PO is determined by:

i_s=floor (UE_ID/N) mod Ns

The following parameters are used for the calculation of PF and i_s above:

T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied).

N: number of total paging frames in T

Ns: number of paging occasions for a PF

PFoffset: offset used for PF determination

UE_ID: 5G-S-TMSI mod 1024"

The additional elements not defined in the transcribed text are SFN—System Frame Number, and 5G-S-TMSI—it is a 48 bit long bit string (TS 23.501) and assigned by the AMF (Access and Mobility Management Function).

Managing power consumption is a general problem in smartphones and it becomes especially critical in multi-USIM devices where several subscriptions need to be maintained in parallel. When a multi-USIM device has two (or more) subscriptions in RRC_Idle/RRC_Inactive, it may need to perform for each of these subscriptions the following actions: monitor paging occasions, perform measurements, and read the relevant system information. The paging occasions associated with different subscriptions are likely to occur at different times. This is the case, since the timing of the paging occasions is computed based on each subscription's 5G-S-TMSI. Consequently, the UE may have to wake-up at different times to monitor each of these paging occasions, which can lead to a significance increase in power consumption.

Figure 3:
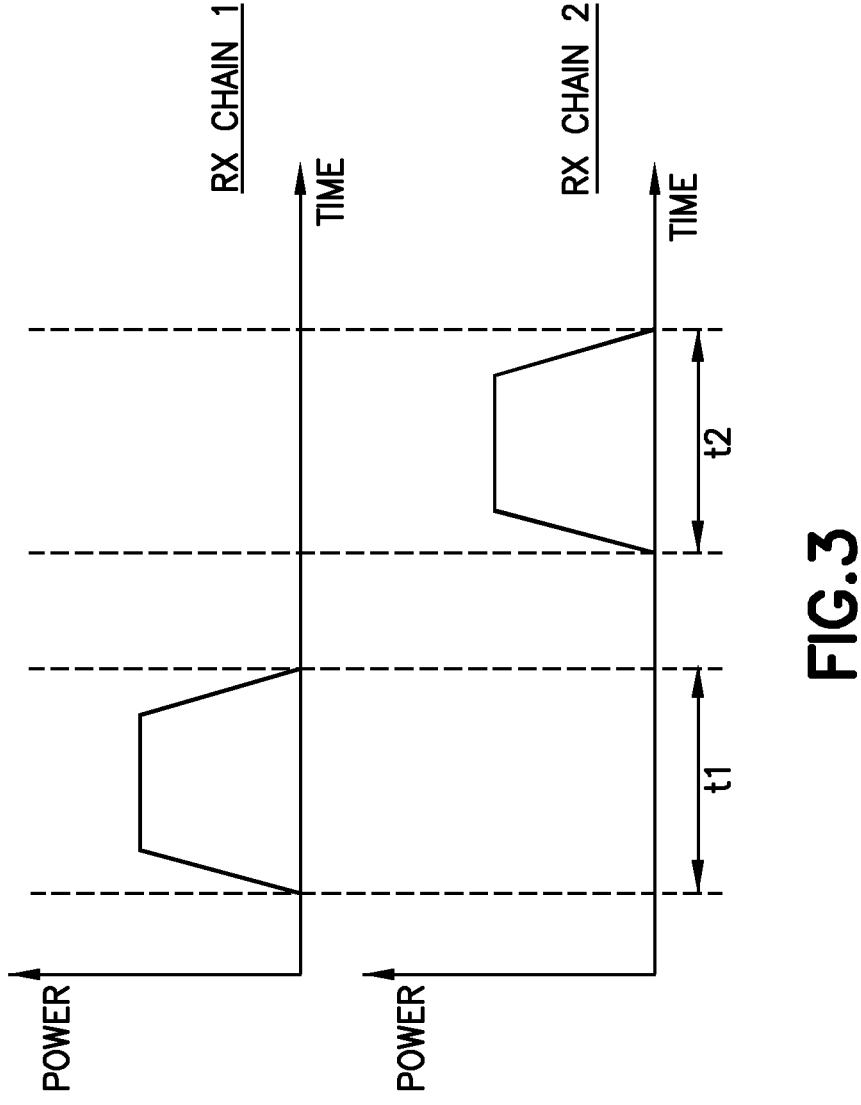
FIG. 3 shows a MUSIM device with at least two RX chains, where RX chains are activated at different times for paging monitoring by each USIM.

Taking as an example a dual RX MUSIM device, where both subscriptions are in RRC_Idle/RRC_Inactive, FIG. 3 illustrates how the device's RX chains (including RX chain 1 and RX chain 2) may be activated at different times due to the paging occasions occurring at different moments. In FIG. 3, RX chain 1 is shown activated at time t1, and RX chain 2 is shown activated at time t2. Alternatively, the same RX chain may be activated twice in order to monitor paging for both USIMs. In any of these cases, the consumed power is increased due to the fact that running two RX chains in parallel (at the exact same time) is more power efficient than running one RX chain at two different times because of the shared resources (e.g. reference oscillator and BB components). In fact, the UE power saving model (TR 38.840) claims that the operation of 2 carriers (equivalent to having two RX chains active) requires 1.7 times more power than a single RX chain, i.e. lower than 2 times which would be the case if the two RX run at different times.

Furthermore, each time an Rx chain needs to become active, it requires ramping-up and ramping-down times which adds to the overall UE power consumption. FIG. 3 illustrates active time for a UE with multiple subscriptions where the associated paging occasions occur at different times, namely time t1 and time t2. The UE in this case may use the same or different RX chains to receive the paging.

Figure 4:
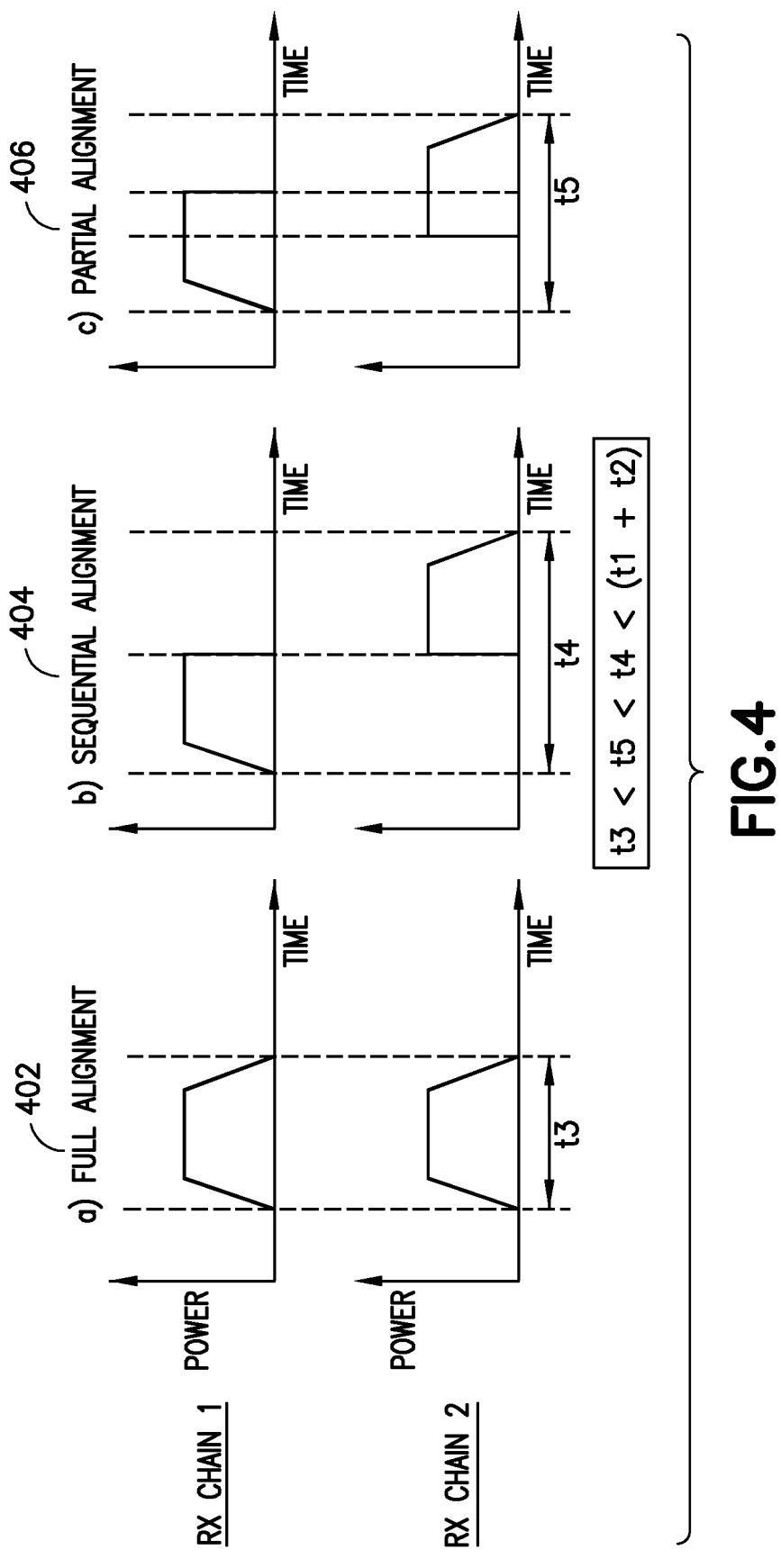
FIG. 4 illustrates a) full alignment of the PO for both USIMs, b) sequential alignment, and c) partial alignment.

The examples herein describe a mechanism that enables the alignment of the POs across multiple USIMs in dual receive devices in order to reduce the device's power consumption as a whole. Specifically, the mechanism can accomplish either of the following PO alignment options: full alignment or sequential/partial alignment. FIG. 4 illustrates a) full alignment 402 of the PO for both USIMs, b) sequential alignment 404, and c) partial alignment 406.

Full alignment 402 is the preferred option. In full alignment, the paging monitoring is forced to be done at the same time (e.g., during time t3), i.e. force PO collision. In this alignment option, the power consumption reduction is due to the HW in the UE being shared when two RX chains are active (e.g., RX chain 1 and RX chain 2), such that the power consumption of having two RX chains in parallel is lower than having two (or the same) Rx chains active at different times. In full alignment, the power ramping-up and ramping-down is only needed once.

Sequential alignment 404 is also depicted in FIG. 4, as is partial alignment 406. In case the UE is not capable of receiving simultaneous paging (e.g. due to lack of two independent HW or if desired PO for full alignment is not available) it can save power if it could use the HW in sequential order and receive the paging right after each other (sequentially) or so the paging for both USIMs are partially overlapping (partial alignment 406). In these alignment options, the power consumption reduction is due to the power ramping-up and ramping-down being only needed once.

As indicated by the example of FIG. 4, the paging monitoring time is such that t3<t5<t4<(t1+t2), where times t1 and t2 are shown in FIG. 3.

The alignment can be accomplished via two different signaling strategies.

In the first strategy (Strategy 1), the UE requests the RAN to provide a new paging occasion (PO). The request may be a direct request for an alternative PO or the request may provide information that may assist the network in assigning an alternative PO. Therefore, whenever the network gets a paging record for that TMSI, it applies it to another PO (the new or alternative PO that the UE has been provided by the network).

In the second strategy (Strategy 2), the UE informs the AMF/gNB that it would like to have another paging offset, and the network/AMF may "re-allocate" 5G-GUTI (based on which the 5G-S-TMSI, the UE paging identity is derived) accordingly.

Novel features of the examples described herein include 1) providing a solution to address the case of dual receive devices in general and especially DSDA devices, where the UE has relatively even higher power consumption due to support of multiple active USIMs and using this capability to save power in some other use cases (since DSDA devices, which are normally dual receive, tend to have especially higher power consumption, the examples described herein are especially applicable to DSDA devices); 2) enforcing PO collisions (or sequential PO) for the USIMs in the same device instead of avoiding them; and 3) aligning by asking the network for a new PO, not a new user ID.

Figure 5:
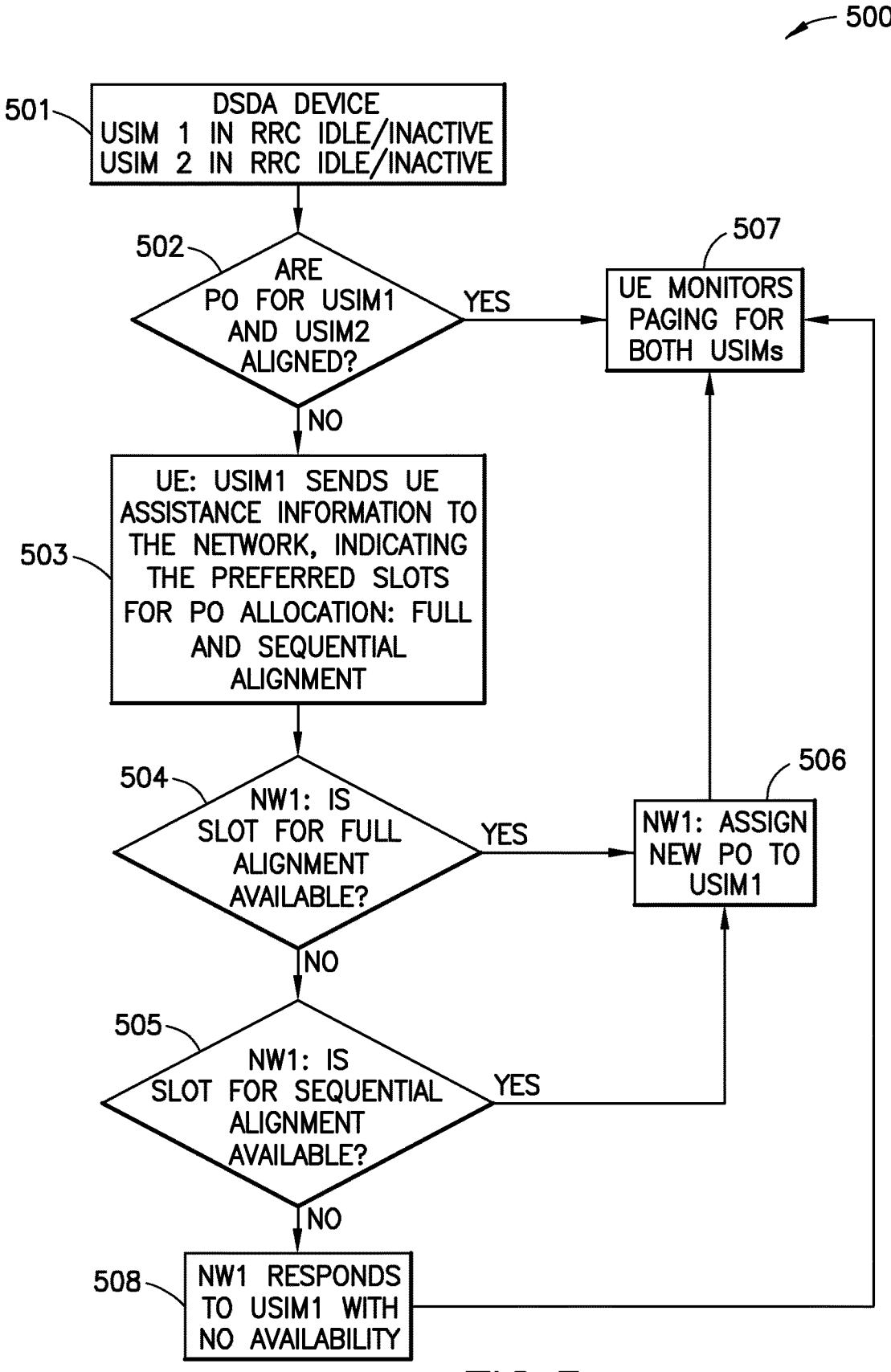
FIG. 5 is an example flowchart of the method described herein for reducing power consumption in dual-receive MUSIM devices.

The details of the idea are presented in the flowchart 500 of FIG. 5 and described as follows.

At 501, a dual receive device is in RRC_Idle or RRC_i-nactive with two (or more) USIMs (e.g., USIM1 and USIM2) and needs to monitor for paging reception.

At 502, the device evaluates whether the paging occasions occur simultaneously. For example, the device evaluates whether the PO for USIM1 and USIM2 are aligned. If 'yes', transition to 507. If 'no', transition to step 503.

At 503, the UE sends UE assistance information (see discussion herein related to "Information exchange between UE, gNB, and AMF") to the network corresponding to its USIM1 including the preferred slots for PO allocation, implemented as full and, optionally, sequential alignment as well. This may be done by (a) indicating the slot/slots that the device would like to get assigned; (b) indicating the slot/slots that the device would not like to get assigned; or (c) indicating the current PO assigned to the other USIM in the same UE device.

If the USIM1 uses option (a), i.e. sending the slot/slots that it would like to get assigned, then in case a single slot is proposed to the network, it corresponds to option 1 (full alignment). In case several slots are proposed to the network, it includes a start and end slot, wherein the NW may place the paging. t_start and t_end should be determined based on the approach chosen by the UE.

Figure 6:
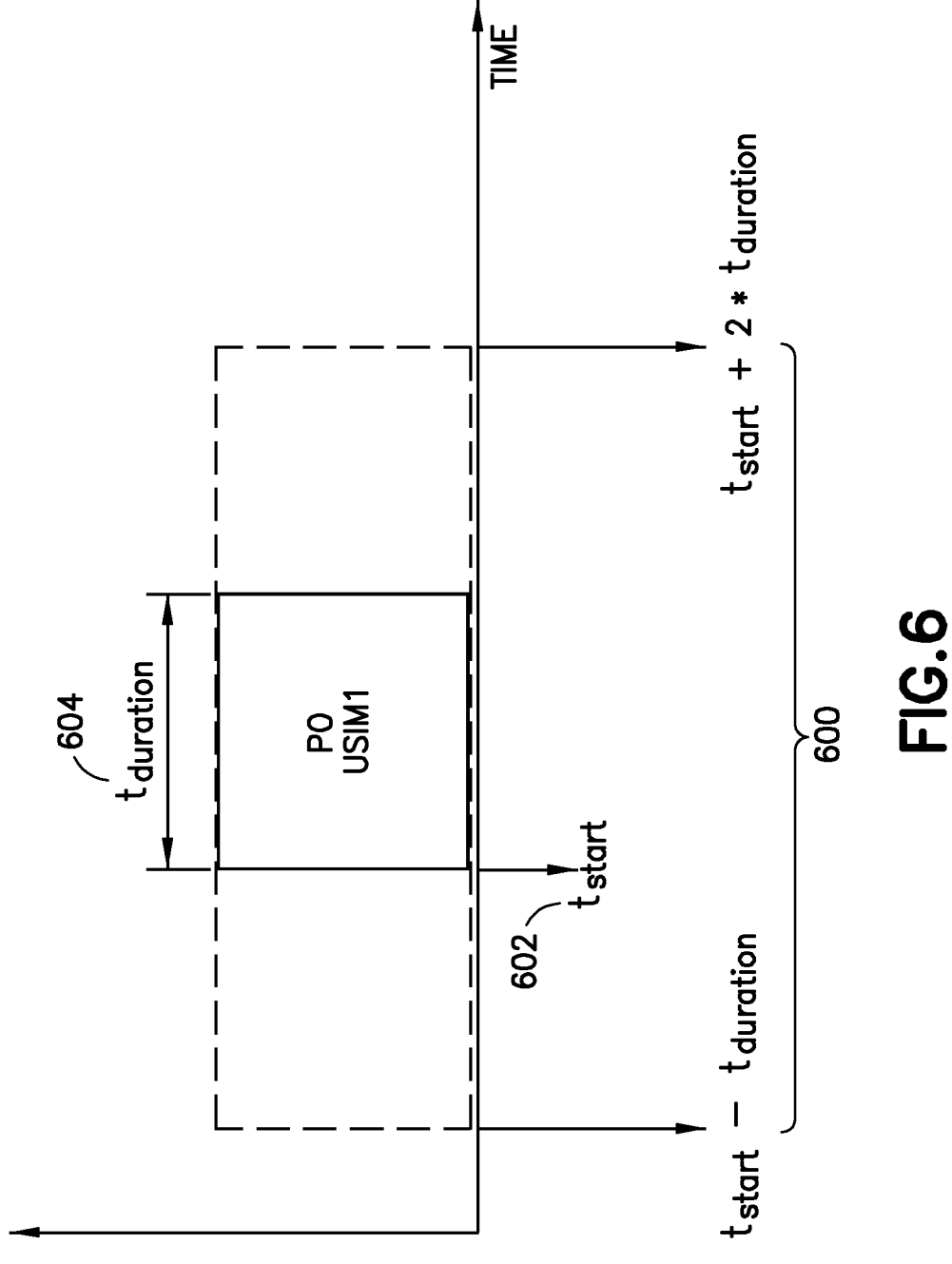
FIG. 6 shows an example range of time where the network can allocate the PO for the at least second USIM.

FIG. 6 shows an example range of time 600 where the network can allocate the PO for the at least second USIM (e.g., USIM2). In FIG. 6, t_start is item 602, and t_duration is item 604. The paging should be allocated between t_start–t_duration and the end point may be t_start+2*t_duration, as depicted in FIG. 6. This provides more flexibility for the NW, at the cost of increased setup time (message—response—message). This option is also more likely to reach an optimal solution. The decision on which option to use might be made by the network depending on the available slots. A user may inform which one is the preferred (most efficient) option that corresponds to full alignment.

If USIM1 uses the option (b), it indicates to the network the range of time in which the paging occasion should not be allocated. This involves the same format as for option (a), such that t_start and t_end may be used.

In case that the USIM1 uses the option (c), sending the current PO assigned to the other USIM (USIM2) in the device to NW1, the network determines which one(s) is/are the desired PO to be assigned to the USIM1 in order to have full or sequential/partial alignment.

At 504, the network checks whether the requested PO for full alignment is available. If 'yes', transition to 506. If 'no', transition to 505.

At 505, the network checks whether the requested PO for sequential alignment is available. If 'yes', transition to 506. If 'no', transition to 508.

Figure 8A:
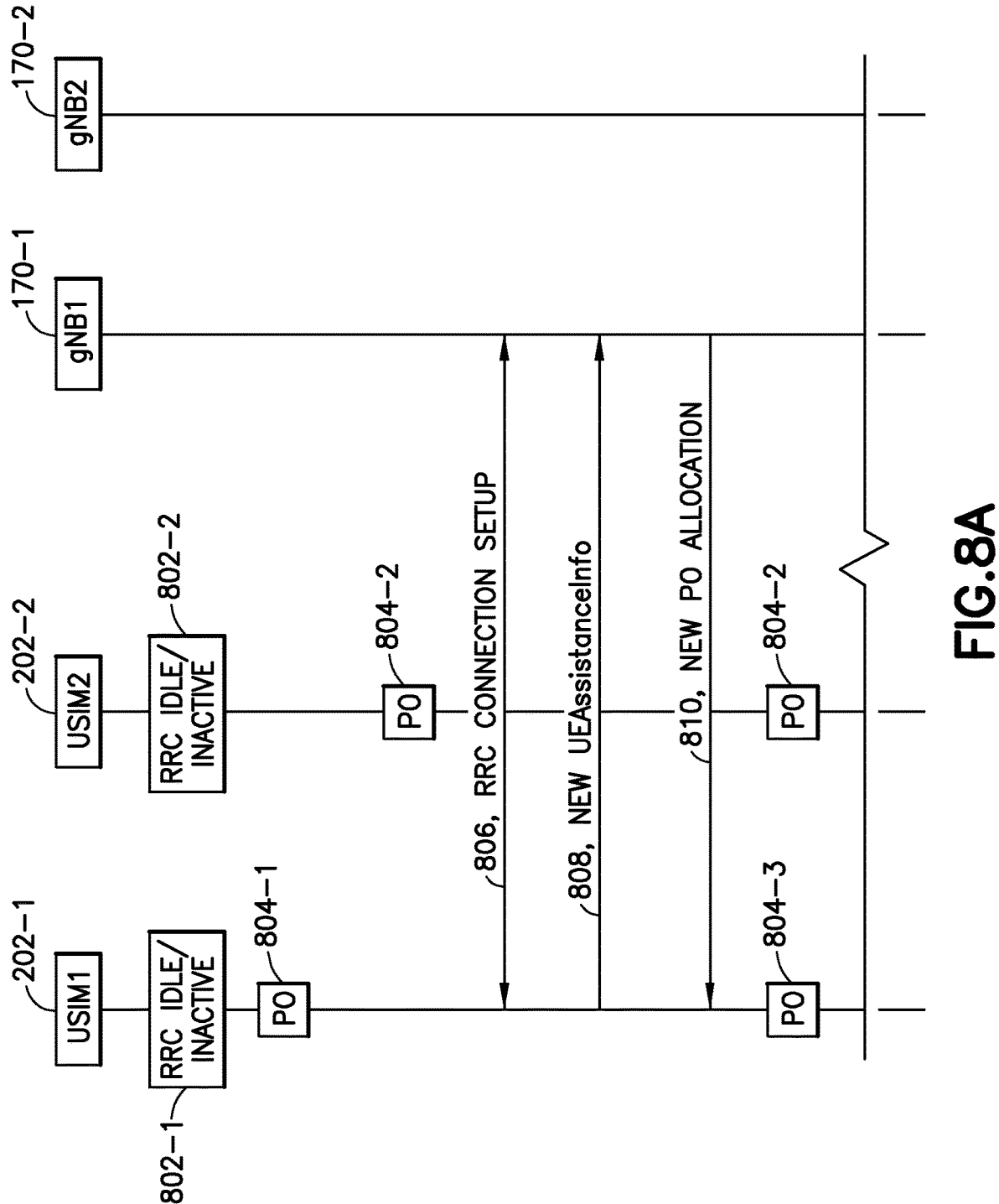
FIG. 8A shows an example signaling exchange between a UE and a gNB where one USIM gets a new PO location from the NW based on the UE's assistance information.

At 506, the network informs the USIM1 about the new assigned PO. An example of the needed signaling exchange is shown in FIG. 8A.

At 507, the UE monitors for paging reception for both USIMs.

At 508, the network (e.g., NW1) informs USIM1 that none of the desired PO are available. Transition to 507, where the UE uses the already assigned PO to monitor for paging.

Figure 8B:
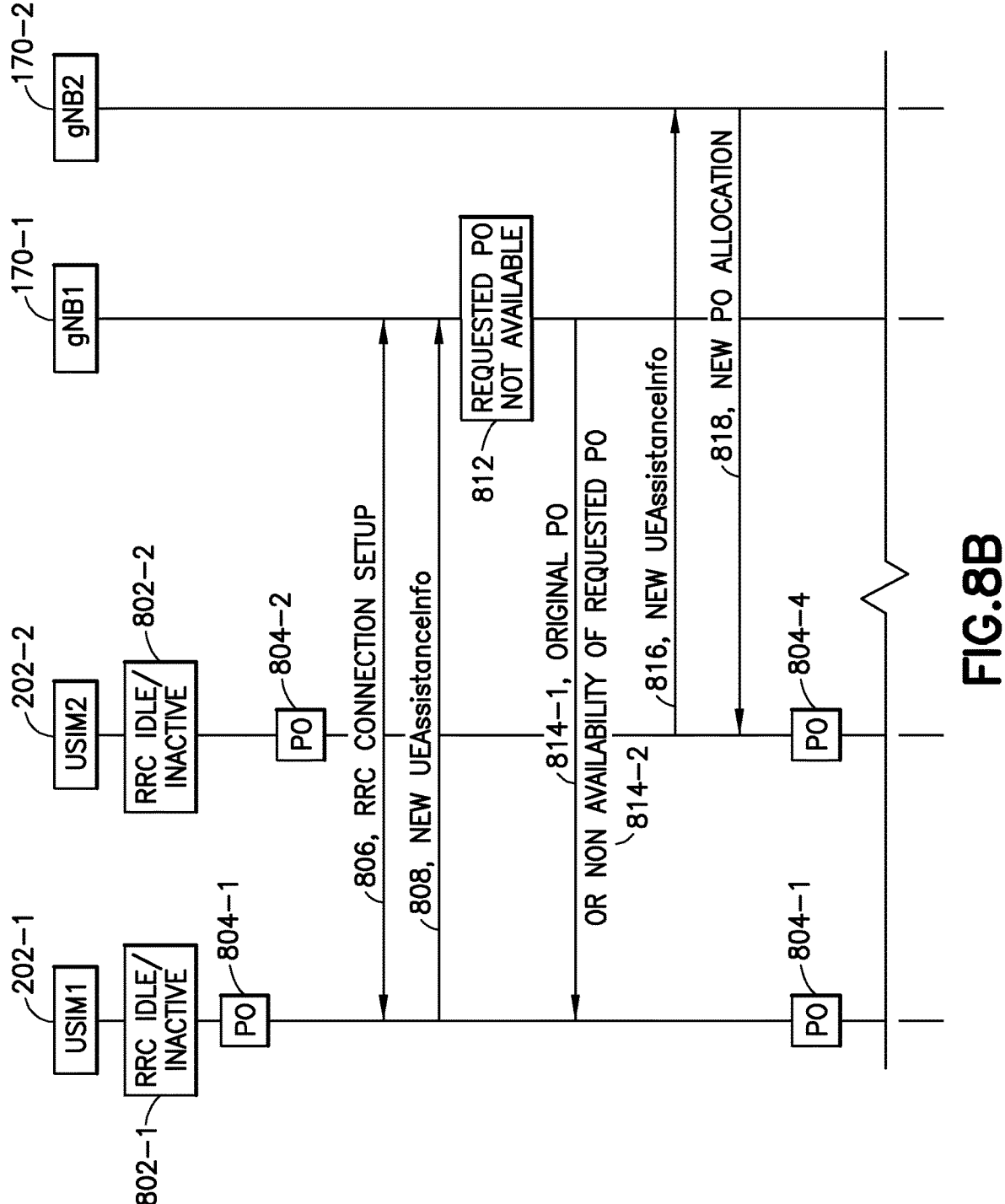
FIG. 8B shows an example signaling exchange between a UE and a gNB where USIM2 gets a new PO from gNB2 after rejection from gNB1 to USIM1.

If USIM1 gets a response from a first public land mobile network (e.g., PLMN1) with "no availability of the requested slots", the device may try to repeat the same process with USIM2 and its network, PLMN2. An example of this process is illustrated in FIG. 8B. If the response is also negative, USIM1 and USIM2 may request the network information about available slots in order to choose a combination of available POs that allow full or, at least, sequential alignment. If the two USIMs are using the same PLMN, one USIM requests such information.

The UE may also decide to prioritize the optimal solution (full alignment) over sequential alignment. In that case, the UE requests a full aligned PO to NW1 and, if the NW1 responds that such PO is not available, the UE requests to NW2 for a full aligned PO. If NW2 also replies that the desired PO is not available, the UE then requests for sequential alignment to NW1. If none of the previous requests are fulfilled, the UE SIM2 asks for sequential alignment to NW2 as a last option. This increases the possibility of reaching an optimal solution at the cost of higher setup time as well as signaling load.

For Strategy 1, a new field may be specified in the existing RRC message, UEassistanceInformation (or in an alternative RRC message), for the UE to indicate its preferred paging occasion. The NW is to provide a new PO location according to the UE's preference (through direct (SFN and slot indication) or indirect signaling (by a value that the UE can use to calculate the PO)). This can be addressed by a modified paging or by an additional field which would carry an element that refers to the alternative paging identity to be used by the UE in a given cell the paging IE could have. If it is not possible for the NW to satisfy the UE's request it should respond with a "reject/NACK" message.

For Strategy 2, a new field in the existing signaling exchange for the UE registration to the core network may be specified (via a message sent between the UE and the AMF, potentially with interaction of the gNB). The information would most likely be carried in an information element within the dedicated NAS-Message, which is also carrying elements like the 5G-GUTI, the UE capability and the registration type. The response from the AMF would need to be redesigned such that there is a response for the UE (with indication of the alternative ID to use when connected to the network, or a rejection of the request).

Information Exchange Between UE, gNB and AMF

Table 1 shows UE Assistance Information field descriptions including the added field for the UE's preferred paging occasion. Refer to TS38.331.

TABLE 1

| *UEAssistanceInformation* field descriptions |
| --- |
| *delayBudgetReport* |
| *reducedBW-FR1-DL* |
| *reducedBW-FR1-UL* |
| *reducedBW-FR2-DL* |
| *reducedBW-FR2-UL* |
| *reducedCCsDL* |
| *reducedCCsUL.* |
| *reducedMIMO-LayersFR1-DL* |
| *reducedMIMO-LayersFR1-UL* |
| *reducedMIMO-LayersFR2-DL* |
| *reducedMIMO-LayersFR2-UL* |
| *type1* |
| *preferredPagingOccasion* <- New element |
| Indicates the Paging Occasion for full or sequential alignment, or the current Paging Occasion allocated to the other USIM in the device. Values could be given as an absolute time, as a time offset relative to the current system timing (based on system frame number), or as a time offset from the current Paging Occasion. |

Table 1 is also shown in FIG. 7 with the added field for the UE's preferred paging occasion highlighted as 702. As indicated in Table 1 and FIG. 7, the new element *preferred PagingOccasion* indicates the paging occasion for full or sequential alignment, or the current paging occasion allocated to the other USIM in the device. Values could be given as an absolute time, as a time offset relative to the current system timing (based on system frame number), or as a time offset from the current paging occasion.

Within this description, parameter names are merely exemplary in nature. Accordingly, in this description where a specific naming of an information element is provided (e.g. *preferred PagingOccasion*), other parameter names are possible.

The UE assistance information sent by the UE to the network includes the preferred PO allocations. The existing UE assistance information message is described in Table 1 and FIG. 7. The novel examples described herein extend it with the paging occasion information for full (and sequential) alignment, as specified in Table 1 (and FIG. 7—item 702).

The gNB may respond to the UE with a new PO allocation or, if the desired PO is not available, it may inform the UE with a non-availability message or assign again the original PO of the UE. A new IE or expansion of an existing IE is needed to carry such information.

The information from the AMF to the gNB related to paging information would be carried in the IE called "Paging IE", and contains the signaling information (from 3GPP TS 38.413 v. 16.0.0) as depicted in FIG. 8A and FIG. 8B.

FIG. 8A shows an example signaling exchange between a UE and a gNB where one USIM gets a new PO location from the NW based on the UE's assistance information In the example signaling exchange shown by FIG. 8A between a UE and a gNB, USIM1 gets a new PO from gNB1. The example signaling exchange of FIG. 8A is between the UE, associated with USIM1 202-1 and USIM2 202-2, and gNB1 170-1 where USIM1 202-1 gets a new PO 804-3 from gNB1 170-1. FIG. 8A shows USIM1 202-1 associated with an RRC idle/inactive state 802-1, and USIM2 202-2 associated with an RRC idle/inactive state 802-2. Initially USIM1 202-1 is associated with PO 804-1, and USIM2 is associated with PO 804-2. RRC connection setup signaling 806 is exchanged between USIM1 202-1 and gNB 1 170-1. As shown in FIG. 8A, USIM1 202-1 provides new UE assistance information 808 to gNB 1 170-1. Then gNB 1 170-1 provides the new PO allocation 810 to USIM1 202-1, wherein USIM1 202-1 is then associated with new PO 804-3.

FIG. 8B shows an example signaling exchange between a UE and a gNB where USIM2 gets a new PO from gNB2 after rejection from gNB1 to USIM1. In particular, the example signaling exchange of FIG. 8B is between the UE, associated with USIM1 202-1 and USIM2 202-2, and gNB 1 170-1 and gNB2 170-2 where USIM2 202-2 gets a new PO 804-4 from gNB2 170-2 after rejection from gNB1 170-1 to USIM1 202-1. FIG. 8B shows USIM1 202-1 associated with an RRC idle/inactive state 802-1, and USIM2 202-2 associated with an RRC idle/inactive state 802-2. Initially USIM1 202-1 is associated with PO 804-1, and USIM2 is associated with PO 804-2. RRC connection setup signaling 806 is exchanged between USIM1 202-1 and gNB 1 170-1. As shown in FIG. 8A, USIM1 202-1 provides new UE assistance information 808 to gNB 1 170-1. gNB 1 170-1 determines that the requested PO is not available 812. gNB 1 170-1 then provides to USIM1 202-1 an original PO signal 814-1 or a non-availability of requested PO signal 814-2. USIM2 202-2 then provides a new UE assistance information signal 816 to gNB2 170-2. gNB2 170-2 then provides a new PO allocation 818 to USIM2 202-2 such that USIM2 202-2 is associated with new PO 804-4.

14

Paging

FIG. 9 shows the content (information elements) in a paging message 900 that is sent by the AMF and is used to page a UE in one or several tracking areas, wherein the direction is from the AMF to the gNB (e.g., AMF→gNB).

Under the examples described herein, the UE paging identity field in the paging message could be modified or the paging IE could have an additional field which would carry an element that refers to the alternative paging identity to be used by the UE in a given cell.

The AMF would potentially obtain the information on the new paging identity to use through gNB assisted information as described in section 8.14.1 of 3GPP TS 38.413, v. 16.0.0:

"8.14.1 UE Radio Capability Info Indication 8.14.1.1 General

The purpose of the UE Radio Capability Info Indication procedure is to enable the NG-RAN node to provide to the AMF UE radio capability-related information. The procedure uses UE-associated signaling.

Successful Operation"

Figure 10:
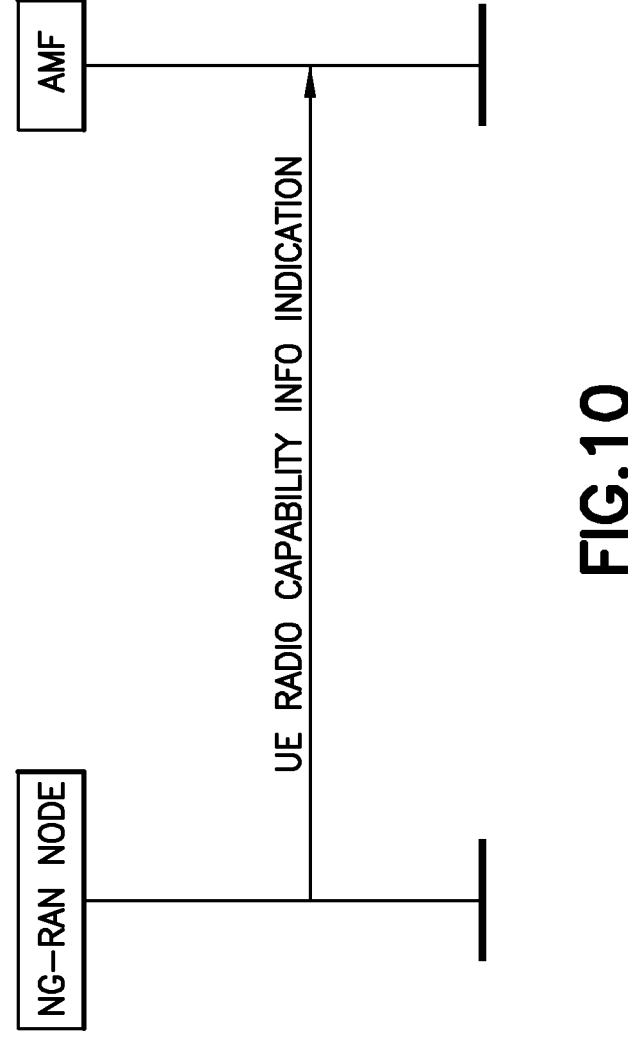
FIG. 10 depicts a UE radio capability info indication (FIG. 8.14.1.2-1 of 3GPP TS 38.413, v. 16.0.0).

FIG. 10 is FIG. 8.14.1.2-1 of 3GPP TS 38.413, v. 16.0.0 showing "UE radio capability info indication" as exchanged between a NG-RAN node and an AMF.

The NG-RAN node controlling a UE-associated logical NG connection initiates the procedure by sending a UE RADIO CAPABILITY INFO INDICATION message to the AMF including the UE radio capability information.

The UE RADIO CAPABILITY INFO INDICATION message may also include paging specific UE radio capability information within the UE Radio Capability for Paging IE.

The UE radio capability information received by the AMF shall replace previously stored corresponding UE radio capability information in the AMF for the UE, as described in TS 23.501.

FIG. 11A illustrates the signaling exchange between the UE and AMF, where the gNB acts as relay to provide the assistance information. In particular, FIG. 11A is an example signaling exchange between the UE (associated with USIM1 202-1 and USIM2 202-2) and the AMF 190-1, where the UE gets a new PO 804-3 from the AMF 190-1 via the gNB1 170-1, where the new PO 804-3 has a paging IE 1104 carrying/containing a new paging ID. FIG. 11A shows USIM1 202-1 associated with an RRC idle/inactive state 802-1, and USIM2 202-2 associated with an RRC idle/inactive state 802-2. Initially USIM1 202-1 is associated with PO 804-1, and USIM2 202-2 is associated with PO 804-2. RRC connection setup signaling 806 is exchanged between USIM1 202-1 and gNB 1 170-1. As shown in FIG. 11A, USIM1 202-1 provides new UE assistance information 808 to gNB 1 170-1. Then gNB 1 170-1 provides a UE radio capability information signal 1102 to the AMF 190-1. The AMF 190-1 provides a paging IE signal 1104 to the gNB 1 170-1. The gNB 1 170-1 provides the new PO allocation 810 to USIM1 202-1, wherein USIM1 202-1 is then associated with new PO 804-3.

The approach of requesting an alternative identity could in principle also be applied on the non-access stratum layer, as shown FIG. 11B, (but would be slightly less associated to the radio access network) and would involve 3GPP TS 24.501 (which would need expansion to cover request/response messages in a similar way as is available for procedures defined in 38.413). The relevant section of 24.501 would be section 9.10.3.3.

As shown in FIG. 11B, the UE may request for a new 5G-GUTI to be allocated as part of registration procedure 1106. Upon receipt of the UE request, the AMF 190-1 uses a UE configuration update procedure to assign new 5G-GUTI 1108. The TMSI which is part of 5G-GUTI needs to be determined in such a way that the UE requested PO (i.e. alternate PO) can be derived.

The technical effects and advantages of the examples described herein include the reduction in the power consumption for dual receive multi USIM devices. Since the paging monitoring requires the UE to wake up very often to check, enabling full alignment or sequential alignment of the PO results in a significant improvement.

FIG. 12 is an example apparatus 1200, which may be implemented in hardware, configured to implement the examples described herein. The apparatus 1200 comprises a processor 1202, at least one non-transitory or transitory memory 1204 including computer program code 1205, wherein the at least one memory 1204 and the computer program code 1205 are configured to, with the at least one processor 1202, cause the apparatus 1200 to implement signaling, a process, a component, a module, and/or a function (collectively 1206) to implement the examples described herein. The apparatus 1200 optionally includes a display and/or I/O interface 1208 that may be used to display aspects or a status of the signaling, process, component, module, or function (e.g., as is being performed or at a subsequent time). The apparatus 1200 includes one or more network (NW) interfaces (I/F(s)) 1210. The NW I/F(s) 1210 may be wired and/or wireless and communicate over the Internet/other network(s) via any communication technique. The NW I/F(s) 1210 may comprise one or more transmitters and one or more receivers. The NW I/F(s) 1210 may comprise standard well-known components such as an amplifier, filter, frequency-converter, (de)modulator, and encoder/decoder circuitry(ies) and one or more antennas. In some examples, the processor 1202 is configured to implement processing 1206 without use of memory 1204.

The memory 1204 may be implemented using any suitable data storage technology, such as semiconductor based memory devices, flash memory, magnetic memory devices and systems, optical memory devices and systems, fixed memory and removable memory. The memory 1204 may comprise a database for storing data. Interface 1212 enables data communication between the various items of apparatus 1200, as shown in FIG. 12. Interface 1212 may be one or more buses, or interface 1212 may be one or more software interfaces configured to pass data within computer program code 1205 or between the items of apparatus 1200. For example, the interface 1212 may be an object-oriented interface in software (in which case interface 1212 may be implemented within computer program code 1205), or the interface 1212 may be one or more buses such as address, data, or control buses, and may include any interconnection mechanism, such as a series of lines on a motherboard or integrated circuit, fiber optics or other optical communication equipment, and the like. The apparatus 1200 need not comprise each of the features mentioned, or may comprise other features as well. Apparatus 1200 may implement method 1300, method 1400, and/or method 1500.

The apparatus 1200 may be UE 110, RAN node 170, or Network Element(s) 190. Thus, processor 1202 may correspond to processor(s) 120, processor(s) 152, or processor(s) 175, memory 1204 may correspond to memory(ies) 125, memory(ies) 155, or memory(ies) 171, computer program code 1205 may correspond to computer program code 123, module 140-1, module 140-2, subscription 1 192, subscription 2 194, or subscription N 196, computer program code 153, module 150-1, module 150-2, or computer program code 173, and NW I/F(s) 1210 may correspond to N/W I/F(s) 161 or N/W I/F(s) 180. Alternatively, apparatus 1200 may not correspond to either of UE 110, RAN node 170, or Network element(s) 190 (for example, apparatus 1200 may be a remote or a cloud apparatus).

FIG. 13 is an example method 1300 implementing MUSIM UE behavior based on the example embodiments described herein. At 1302, the method includes aligning a plurality of paging occasions across at least two identities of a communication device, the aligning being performed via either 1304 or 1306. At 1304, the method includes requesting and receiving from a communication network a paging occasion for the communication device with at least two identities using at least one of the identities to perform the aligning. At 1306, the method includes requesting and receiving from the communication network a reallocation of a paging offset using at least one of the identities to perform the aligning. The method 1300 may be performed by a user equipment, such as UE 110 of FIG. 1 having multiple identities/subscriptions, or a MUSIM device, or by apparatus 1200.

FIG. 14 is another example method 1400 implementing NW behavior, based on the example embodiments described herein. At 1402, the method includes providing to a communication device with at least two identities: a paging occasion, or a reallocation of a paging offset. At 1404, the method includes providing the paging occasion or the reallocated paging offset as configured to align a plurality of paging occasions for the communication device. The method 1400 may be performed by a radio node, such as the RAN node 170 of FIG. 1, or by apparatus 1200.

FIG. 15 is another example method 1500 implementing NW behavior, based on the example embodiments described herein. At 1502, the method includes providing a paging information element associated with a paging occasion to an identity of a communication device with at least two identities. At 1504, the method includes providing a reallocation of a paging offset for one of the identities of the communication device. Items 1502 and 1504 are alternatives. At 1506, the method includes providing the paging information element or the reallocation of the paging offset as configured to align a plurality of paging occasions for the communication device. The method 1500 may be performed by AMF functionality of a network element, such as the network element 190 of FIG. 1, or by apparatus 1200.

Throughout this description, reference numbers 110-"x", 170-"x", and 190-"x" correspond to the actual items or variations of the items of FIG. 1, including UE 110, RAN node 170, and Network Element(s) 190. As an example, MUSIM device 110-1 of FIG. 2A and FIG. 2B may be or implement functionality of the UE 110 of FIG. 1, AMF 190-1 of FIG. 11A and FIG. 11B may be or implement functionality of the Network Element(s) 190 of FIG. 1, etc.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used herein, the term 'circuitry', 'circuit' and variants may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/ software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. Circuitry or circuit may also be used to mean a function or a process used to execute a method.

An example method includes aligning a plurality of paging occasions across at least two identities of a communication device; and requesting and receiving from a communication network a paging occasion for the communication device with at least two identities using at least one of the identities to perform the aligning; or requesting and receiving from the communication network a reallocation of a paging offset using at least one of the identities to perform the aligning.

The method may further include wherein the communication device comprises at least two receivers or at least two receive chains.

The method may further include wherein the aligning is a full alignment such that paging monitoring of at least two of the identities is simultaneous, and at least two receiver chains are active.

The method may further include wherein the aligning is a sequential alignment such that paging monitoring of at least two of the identities is sequential in time.

The method may further include wherein the aligning is a partial alignment such that paging monitoring of at least two of the identities partially overlap.

The method may further include wherein the aligning creates intended gaps between the plurality of paging occasions.

The method may further include wherein the paging offset is derived from a fifth generation new radio global unique temporary identifier (5G-GUTI).

The method may further include providing assistance information from at least one identity of the communication device to the corresponding communication network to indicate a preferred location for the paging occasion.

The method may further include wherein the preferred location comprises at least one of: a start slot and an end slot; a start frame and an end frame; and/or a start time and an end time.

The method may further include providing a field in a signaling exchange for registration of at least one identity of the communication device to the corresponding communication network for the reallocation of the paging offset.

The method may further include in response to receiving an indication of unavailability of the paging occasion from the communication network, requesting and receiving the paging occasion using a different one of the at least two identities.

The method may further include prioritizing a full alignment over a sequential or partial alignment of the paging occasions by the communication device.

The method may further include wherein the at least two identities are subscription identities.

The method may further include wherein the at least two identities are at least one of a subscriber identity module (SIM), a universal subscriber identity module (USIM), an embedded subscriber identity module (e-SIM), or a certificate.

An example method includes providing to a communication device with at least two identities: a paging occasion, or a reallocation of a paging offset; and providing the paging occasion or the reallocated paging offset as configured to align a plurality of paging occasions for the communication device.

The method may further include receiving assistance information from the communication device that indicates a preferred location for the signaled paging occasion.

The method may further include providing radio capability information of the communication device to an access and mobility management function based on the assistance information; and receiving a paging information element from the access and mobility management function comprising information related to the providing of the paging occasion.

An example method includes providing a paging information element associated with a paging occasion to an identity of a communication device with at least two identities; or providing a reallocation of a paging offset for one of the identities of the communication device; and providing the paging information element or the reallocation of the paging offset as configured to align a plurality of paging occasions for the communication device.

The method may further include wherein the paging information element associated with the paging occasion is provided in response to receiving radio capability information of the communication device from a radio node.

The method may further include wherein the reallocation of the paging offset is provided in response to a registration procedure involving a request for a reallocation from one of the at least two identities.

An example apparatus includes at least one processor; and at least one non-transitory memory including computer program code; wherein the at least one memory and the computer program code are configured to, with the at least one processor, cause the apparatus at least to: align a plurality of paging occasions across at least two identities of a communication device; and requesting and receiving from a communication network a paging occasion for the communication device with at least two identities using at least one of the identities to perform the aligning; or requesting and receiving from the communication network a reallocation of a paging offset using at least one of the identities to perform the aligning.

An example apparatus includes at least one processor; and at least one non-transitory memory including computer program code; wherein the at least one memory and the computer program code are configured to, with the at least one processor, cause the apparatus at least to: provide to a communication device with at least two identities: a paging occasion, or a reallocation of a paging offset; and provide the paging occasion or the reallocated paging offset as configured to align a plurality of paging occasions for the communication device.

An example apparatus includes at least one processor; and at least one non-transitory memory including computer program code; wherein the at least one memory and the computer program code are configured to, with the at least one processor, cause the apparatus at least to: provide a paging information element associated with a paging occasion to an identity of a communication device with at least two identities; or provide a reallocation of a paging offset for one of the identities of the communication device; and provide the paging information element or the reallocation of the paging offset as configured to align a plurality of paging occasions for the communication device.

An example non-transitory program storage device readable by a machine, tangibly embodying a program of instructions executable by the machine for performing operations may be provided, the operations comprising: aligning a plurality of paging occasions across at least two identities of a communication device; and requesting and receiving from a communication network a paging occasion for the communication device with at least two identities using at least one of the identities to perform the aligning; or requesting and receiving from the communication network a reallocation of a paging offset using at least one of the identities to perform the aligning.

An example non-transitory program storage device readable by a machine, tangibly embodying a program of instructions executable by the machine for performing operations may be provided, the operations comprising: providing to a communication device with at least two identities: a paging occasion, or a reallocation of a paging offset; and providing the paging occasion or the reallocated paging offset as configured to align a plurality of paging occasions for the communication device.

An example non-transitory program storage device readable by a machine, tangibly embodying a program of instructions executable by the machine for performing operations may be provided, the operations comprising: providing a paging information element associated with a paging occasion to an identity of a communication device with at least two identities; or providing a reallocation of a paging offset for one of the identities of the communication device; and providing the paging information element or the reallocation of the paging offset as configured to align a plurality of paging occasions for the communication device.

An example apparatus includes means for aligning a plurality of paging occasions across at least two identities of a communication device; and means for requesting and receiving from a communication network a paging occasion for the communication device with at least two identities using at least one of the identities to perform the aligning; or means for requesting and receiving from the communication network a reallocation of a paging offset using at least one of the identities to perform the aligning.

An example apparatus includes means for providing to a communication device with at least two identities: a paging occasion, or a reallocation of a paging offset; and means for providing the paging occasion or the reallocated paging offset as configured to align a plurality of paging occasions for the communication device.

An example apparatus includes means for providing a paging information element associated with a paging occasion to an identity of a communication device with at least two identities; or means for providing a reallocation of a paging offset for one of the identities of the communication device; and means for providing the paging information element or the reallocation of the paging offset as configured to align a plurality of paging occasions for the communication device.

An example apparatus includes circuitry configured to align a plurality of paging occasions across at least two identities of a communication device; and circuitry configured to request and receive from a communication network a paging occasion for the communication device with at least two identities using at least one of the identities to perform the aligning; or circuitry configured to request and receive from the communication network a reallocation of a paging offset using at least one of the identities to perform the aligning.

An example apparatus includes circuitry configured to provide to a communication device with at least two identities: a paging occasion, or a reallocation of a paging offset; and circuitry configured to provide the paging occasion or the reallocated paging offset as configured to align a plurality of paging occasions for the communication device.

An example apparatus includes circuitry configured to provide a paging information element associated with a paging occasion to an identity of a communication device with at least two identities; or circuitry configured to provide a reallocation of a paging offset for one of the identities of the communication device; and circuitry configured to provide the paging information element or the reallocation of the paging offset as configured to align a plurality of paging occasions for the communication device.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The following acronyms and abbreviations that may be found in the specification and/or the drawing figures are defined as follows:

3GPP 3rd generation partnership project
3GPP2 3rd generation partnership project 2
5G fifth generation
5GC 5G core network
5G-GUTI 5G NR global unique temporary identifier
5GS 5G system
5G-S-TMSI 5G SAE temporary mobile subscriber identity; 48 bit long bit string (TS 23.501) and assigned by the AMF
AMF access and mobility management function
BB baseband
BW bandwidth
CC component carrier
CU central unit or centralized unit
DL downlink
DRX discontinuous reception
DU distributed unit
DSDA dual SIM dual active
DSDS dual SIM dual standby
DR-DSDS Dual receive dual SIM dual standby
DSP digital signal processor
e.g. for example
eMBB enhanced mobile broad band
eNB evolved node B (e.g., an LTE base station)
EN-DC E-UTRA-NR dual connectivity
en-gNB node providing NR user plane and control plane protocol terminations towards the UE, and acting as a secondary node in EN-DC
EPC evolved packet core EPS evolved packet system
eSIM or e-SIM electronic (or embedded) subscriber iden-
tity module
E-UTRA evolved universal terrestrial radio access, i.e.,
the LTE radio access technology
F1 control interface between CU and DU
FR1 frequency range 1
FR2 frequency range 2
FS feature or study item
gNB base station for 5G/NR, i.e., a node providing NR
user plane and control plane protocol terminations
towards the UE, and connected via the NG interface to
the 5GC
GUTI global unique temporary identifier
HW hardware
i.e. that is
I/F interface
ID identifier
IE information element
IMSI international mobile subscriber identity
info information
I/O input/output
LMF location management function
LTE long term evolution
M mandatory
MAC medium access control
max maximum
MIMO multiple-input multiple-output
MME mobility management entity
MNO mobile network operator
MT mobile termination
MUMA multi USIM multi active
MUMS multi USIM multi standby
MUSIM multi universal subscriber identity module
MVNO mobile virtual network operator
NACK negative acknowledgement
NAS non-access stratum
ng or NG new generation
ng-eNB new generation eNB
NG-RAN new generation radio access network
no number
NR new radio
N/W or NW network
O optional
O&M operation and maintenance
PDCP packet data convergence protocol
PF paging frame
PHY physical layer
PLMN public land mobile network
PO paging occasion
RAN radio access network
RAN2 RAN WG2 or radio layer 2
RAT radio access technology
Rel- release
RF radio frequency
RLC radio link control
RNTI radio network temporary identifier
RP- 3GPP RAN
RRC radio resource control
RRH remote radio head
RU radio unit
Rx or RX receiver or interchangeably receive
SA system aspects
SA2 service and system aspects working group 2
SAE system architecture evolution
SDAP service data adaptation protocol
SFN system frame number SGW serving gateway
SIM subscriber identity module
SMF session management function
SP 3GPP SA
S-TMSI SAE TMSI
SUPI subscription permanent identifier
TAI tracking area identifier
TMSI temporary mobile subscriber identity
TR technical report
TS technical specification
TSG technical specification group
Tx or TX transmitter or interchangeably transmit
UE user equipment
UL uplink
UPF user plane function
USIM universal subscriber identity module
v. version
VoLTE voice over LTE
VoNR voice over NR
WG working group
WT work task
The invention claimed is:
1. An apparatus comprising:
at least one processor; and
at least one non-transitory memory including computer
program code;
wherein the at least one memory and the computer
program code are configured to, with the at least one
processor, cause the apparatus at least to:
align a plurality of paging occasions across at least two
subscription identities of a Multi Universal Subscriber
Identity Module (multi-USIM) device by coordinating
a timing of the plurality of the paging occasions accord-
ing to a specified temporal relationship; and
requesting and receiving from a communication network
a paging occasion for the multi-USIM device with at
least one of the subscription identities to perform the
aligning; or
requesting and receiving, from the communication net-
work, a reallocation of a paging offset for the at least
one of the subscription identities to perform the align-
ing.
2. The apparatus of claim 1, wherein the multi-USIM
device comprises at least two receivers.
3. The apparatus of claim 1, wherein the aligning is a full
alignment such that paging monitoring of at least two of the
subscription identities is simultaneous, and at least two
receiver chains are active.
4. The apparatus of claim 1, wherein the aligning is a
sequential alignment such that paging monitoring of at least
two of the subscription identities is sequential in time.
5. The apparatus of claim 1, wherein the aligning is a
partial alignment such that paging monitoring of at least two
of the subscription identities partially overlap.
6. The apparatus of claim 1, wherein the aligning creates
intended gaps between the plurality of paging occasions.
7. The apparatus of claim 1, further causing the apparatus
to provide assistance information from at least one identity
of the multi-USIM device to the communication network to
indicate a preferred location for the paging occasion.
8. The apparatus of claim 7, wherein the preferred loca-
tion comprises at least one of:
a start slot and an end slot;
a start frame and an end frame; or
a start time and an end time.
9. The apparatus of claim 1, further causing the apparatus
to provide a field in a signaling exchange for registration of at least one identity of the multi-USIM device to the communication network for the reallocation of the paging offset.

10. The apparatus of claim 1, further causing the apparatus to in response to receiving an indication of unavailability of the paging occasion from the communication network, request and receive the paging occasion using a different one of the at least two identities.

11. The apparatus of claim 1, further causing the apparatus to prioritize a full alignment over a sequential or partial alignment of the paging occasions by the multi-USIM device.

12. The apparatus of claim 1, wherein the at least two subscription identities are at least one of a subscriber identity module, a universal subscriber identity module, an embedded subscriber identity module, or a certificate.

13. A method comprising:

aligning a plurality of paging occasions across at least two subscription identities of a Multi Universal Subscriber Identity Module (multi-USIM) device by coordinating a timing of the plurality of the paging occasions according to a specified temporal relationship; and requesting and receiving from a communication network a paging occasion for the multi-USIM device with at least one of the subscription identities to perform the aligning; or requesting and receiving from the communication network a reallocation of a paging offset for the at least one of the subscription identities to perform the aligning.

14. The method of claim 13, wherein the multi-USIM device comprises at least two receivers.

15. The method of claim 13, wherein the aligning is a full alignment such that paging monitoring of at least two of the subscription identities is simultaneous, and at least two receiver chains are active.

16. The method of claim 13, wherein the aligning is a sequential alignment such that paging monitoring of at least two of the subscription identities is sequential in time; or wherein the aligning is a partial alignment such that paging monitoring of at least two of the subscription identities partially overlap.

17. The method of claim 13, wherein the aligning creates intended gaps between the plurality of paging occasions.

18. The method of claim 13, further comprising providing assistance information from at least one identity of the multi-USIM device to the communication network to indicate a preferred location for the paging occasion.

19. The method of claim 18, wherein the preferred location comprises at least one of:

a start slot and an end slot;

a start frame and an end frame; or a start time and an end time.

20. An apparatus comprising:

at least one processor; and at least one non-transitory memory including computer program code;

wherein the at least one memory and the computer program code are configured to, with the at least one processor, cause the apparatus at least to:

configure at least one of a paging information element associated with a paging occasion, or a reallocation of a paging offset, so as to align a plurality of paging occasions across at least two subscription identities of a multi-Universal Subscriber Identity Module (multi-USIM) device according to a specified temporal relationship; and provide the configured paging information element or the reallocated paging offset to the multi-USIM device.

\* \* \* \* \*